(12) United States Patent
Chen et al.

(10) Patent No.: US 10,714,132 B1
(45) Date of Patent: Jul. 14, 2020

(54) MAGNETIC FLUX GUIDING DEVICES ALL AROUND MAIN POLE DESIGN WITHOUT LEADING SHIELD AND SIDE SHIELDS IN ASSISTED WRITING APPLICATIONS

(71) Applicant: Headway Technologies, Inc., Milpitas, CA (US)

(72) Inventors: Wenyu Chen, San Jose, CA (US); Ying Liu, San Jose, CA (US); Yan Wu, Cupertino, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/451,137

(22) Filed: Jun. 25, 2019

(51) Int. Cl.
*G11B 5/48* (2006.01)
*G11B 5/187* (2006.01)
*G11B 5/11* (2006.01)

(52) U.S. Cl.
CPC ............. *G11B 5/4826* (2013.01); *G11B 5/11* (2013.01); *G11B 5/187* (2013.01)

(58) Field of Classification Search
CPC .......... G11B 5/4826; G11B 5/11; G11B 5/187
USPC ................... 360/125.31–125.35, 125.1–125.5
See application file for complete search history.

(56) References Cited

U.S. PATENT DOCUMENTS

| | | | |
|---|---|---|---|
| 2,634,133 A * | 4/1953 | Carbonneau | G11B 19/265 369/267 |
| 3,869,129 A * | 3/1975 | Tateishi | G11B 19/26 369/239 |
| 6,785,092 B2 | 8/2004 | Covington et al. | |
| 6,809,899 B1 | 10/2004 | Chen et al. | |
| 6,954,340 B2 | 10/2005 | Shukh et al. | |
| 7,009,812 B2 | 3/2006 | Hsu et al. | |
| 7,589,600 B2 | 9/2009 | Dimitrov et al. | |

(Continued)

FOREIGN PATENT DOCUMENTS

| JP | 2002-133610 | 5/2002 |
|---|---|---|
| JP | 2002-298309 | 10/2002 |

(Continued)

OTHER PUBLICATIONS

PTO Office Action, U.S. Appl. No. 12/964,202, Applicant: Sasaki et al., dated Nov. 28, 2012, 11 pages.

(Continued)

*Primary Examiner* — Allen T Cao
(74) *Attorney, Agent, or Firm* — Saile Ackerman LLC; Stephen B. Ackerman

(57) ABSTRACT

A perpendicular magnetic recording writer has a main pole (MP) with a first flux guiding (FG) device in a write gap between the MP trailing side and a trailing shield, a second FG device in each side gap and adjoining a MP side, and third FG device in the leading gap and adjoining the MP leading side. At least one of a first and second non-magnetic conductive layer (NMC1 and NMC2) contacts the third FG device and second FG devices, respectively, instead of a conventional leading shield and side shield. Each FG device has a flux guiding layer (FGL) with a magnetization that flips to oppose a gap flux field when a current is applied across the respective gap thereby enhancing the MP write field. NMC1 and NMC2 allow better wear and corrosion resistance in addition to improved return field and down-track field gradient, and acceptable side shield stray field.

13 Claims, 13 Drawing Sheets

(56) References Cited

U.S. PATENT DOCUMENTS

| | | | |
|---|---|---|---|
| 7,724,469 B2 | 5/2010 | Gao et al. | |
| 7,835,111 B2 | 11/2010 | Flint et al. | |
| 7,957,098 B2 | 6/2011 | Yamada et al. | |
| 7,963,024 B2 | 6/2011 | Neuhaus | |
| 7,978,442 B2 | 7/2011 | Zhang et al. | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,154,825 B2 | 4/2012 | Takashita et al. | |
| 8,203,389 B1 | 6/2012 | Zhou et al. | |
| 8,264,792 B2 | 9/2012 | Bai et al. | |
| 8,270,112 B2 | 9/2012 | Funayama et al. | |
| 8,295,008 B1 | 10/2012 | Sasaki et al. | |
| 8,310,787 B1 | 11/2012 | Sasaki et al. | |
| 8,320,079 B2 | 11/2012 | Iwasaki et al. | |
| 8,427,781 B1 | 4/2013 | Sasaki et al. | |
| 8,446,690 B2 | 5/2013 | Alex et al. | |
| 8,462,461 B2 | 6/2013 | Braganca et al. | |
| 8,477,452 B2 | 7/2013 | Sasaki et al. | |
| 8,493,687 B2 | 7/2013 | Sasaki et al. | |
| 8,582,240 B1 | 11/2013 | Chen et al. | |
| 8,582,241 B1 | 11/2013 | Yu et al. | |
| 8,604,886 B2 | 12/2013 | Nikonov et al. | |
| 8,634,163 B2 | 1/2014 | Tanabe et al. | |
| 8,730,617 B1 | 5/2014 | Hsiao et al. | |
| 8,749,919 B2 | 6/2014 | Sasaki et al. | |
| 8,767,347 B1 | 7/2014 | Sasaki et al. | |
| 8,792,210 B2 | 7/2014 | de la Fuente et al. | |
| 9,142,228 B2 | 9/2015 | Fujita et al. | |
| 9,202,484 B1 | 12/2015 | Watanabe et al. | |
| 9,202,528 B2 | 12/2015 | Furukawa et al. | |
| 9,230,571 B1 | 1/2016 | Chen et al. | |
| 9,299,367 B1 | 3/2016 | Tang et al. | |
| 9,361,912 B1 | 6/2016 | Liu et al. | |
| 9,406,316 B2 | 8/2016 | Urakami et al. | |
| 9,406,317 B1 | 8/2016 | Tang et al. | |
| 9,466,319 B1 | 10/2016 | Tang et al. | |
| 9,792,933 B2 | 10/2017 | Koizumi et al. | |
| 9,824,701 B2 | 11/2017 | Tang et al. | |
| 9,934,797 B2 | 4/2018 | Takahashi et al. | |
| 9,966,091 B2 | 5/2018 | Chen et al. | |
| 10,032,469 B2 | 7/2018 | Lim et al. | |
| 10,032,470 B1 | 7/2018 | Degawa et al. | |
| 10,037,772 B2 | 7/2018 | Okamura et al. | |
| 10,181,334 B1 | 1/2019 | Song et al. | |
| 2002/0034043 A1 | 3/2002 | Okada et al. | |
| 2004/0150910 A1 | 8/2004 | Okada et al. | |
| 2005/0128637 A1 | 6/2005 | Johnston et al. | |
| 2005/0141137 A1 | 6/2005 | Okada et al. | |
| 2006/0044682 A1 | 3/2006 | Le et al. | |
| 2006/0087765 A1 | 4/2006 | Iwakura et al. | |
| 2006/0103978 A1 | 5/2006 | Takano et al. | |
| 2007/0177301 A1 | 8/2007 | Han et al. | |
| 2008/0013209 A1 | 1/2008 | Sasaki et al. | |
| 2008/0088972 A1 | 4/2008 | Sasaki et al. | |
| 2009/0059426 A1* | 3/2009 | Sasaki | G11B 5/1278 360/125.02 |
| 2009/0080106 A1 | 3/2009 | Shimizu et al. | |
| 2009/0128953 A1 | 5/2009 | Jiang et al. | |
| 2009/0296275 A1 | 12/2009 | Sasaki et al. | |
| 2010/0165517 A1 | 7/2010 | Araki et al. | |
| 2010/0277832 A1* | 11/2010 | Bai | G11B 5/1278 360/125.03 |
| 2011/0211271 A1 | 9/2011 | Ng et al. | |
| 2012/0292723 A1 | 11/2012 | Luo et al. | |
| 2014/0071562 A1 | 3/2014 | Chen et al. | |
| 2014/0177092 A1 | 6/2014 | Katada et al. | |
| 2015/0043106 A1 | 2/2015 | Yamada et al. | |
| 2016/0218728 A1 | 7/2016 | Zhu | |
| 2017/0092304 A1 | 3/2017 | Kozumi et al. | |
| 2017/0133044 A1 | 5/2017 | Lim et al. | |
| 2018/0075868 A1 | 3/2018 | Koui et al. | |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

* cited by examiner

MAGNETIC FLUX GUIDING DEVICES ALL AROUND MAIN POLE DESIGN WITHOUT LEADING SHIELD AND SIDE SHIELDS IN ASSISTED WRITING APPLICATIONS

RELATED PATENT APPLICATIONS

This application is related to the following: filed on Jul. 17, 2018, Ser. No. 16/037,197 and issued as U.S. Pat. No. 10,325,618; filed on Nov. 21, 2018, Ser. No. 16/197,586 and issued as U.S. Pat. No. 10,424,326; filed on Apr. 2, 2019, Ser. No. 16/372,517; and filed on Jun. 25, 2019, Ser. No. 16/451,146; assigned to a common assignee and herein incorporated by reference in their entirety.

TECHNICAL FIELD

The present disclosure relates to a design for a perpendicular magnetic recording (PMR) writer wherein one or both of the leading shield and side shields are replaced with a non-magnetic conducting layer with improved resistance to wear and corrosion, and a flux guiding (FG) device is inserted in the write gap (WG), side gaps, and leading gap around a main pole (MP), and has a magnetic layer with a magnetization that flips to an opposite direction when a current of sufficient magnitude is applied across the aforementioned gaps thereby increasing the reluctance in the gaps and forcing additional flux out of the MP tip at the air bearing surface (ABS) to enhance the write field on the magnetic recording medium.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. One approach that is currently being investigated is microwave assisted magnetic recording (MAMR), which is described by J-G. Zhu et al. in "Microwave Assisted Magnetic Recording", IEEE Trans. Magn., vol. 44, pp. 125-131 (2008). Although MAMR has been in development for a number of years, it is not shown enough promise to be introduced into any products yet. In particular, a difficult challenge is to find a spin torque oscillator (STO) film that is thin enough to fit into the small write gap required for state of the art products while providing a high magnetic moment in the oscillation layer to generate a sufficient radio-frequency field on a magnetic medium bit for the assist effect.

STO devices are based on a spin-torque-transfer effect that arises from the spin dependent electron transport properties of ferromagnetic (FM1)-spacer-ferromagnetic (FM2) multilayers. When spin polarized current from the FM1 layer passes through the spacer and FM2 layer in a current perpendicular-to-plane direction, the spin angular moment of electrons incident on the FM2 layer interacts with magnetic moments of the FM2 layer near the interface between the FM2 layer and the non-magnetic spacer. Through this interaction, the electrons transfer a portion of their angular momentum to the FM2 layer. As a result, spin-polarized current can switch (flip) the FM2 magnetization direction if the current density is sufficiently high. STO devices may have FM layers with perpendicular magnetic anisotropy (PMA) where magnetization is aligned substantially perpendicular to the plane of the FM layer. However, unlike Magnetoresistive Random Access Memory (MRAM) where PMA is necessary to keep magnetization perpendicular to plane in a free layer and reference layer, for example, STO in MAMR and related applications has a sufficiently strong write gap field to align magnetization in magnetic layers without requiring inherent PMA in the FM1 and FM2 layers.

In a PMR writer, the main pole generates a large local magnetic field to change the magnetization direction of the medium in proximity to the writer. By switching the direction of the field using a switching current that drives the writer, one can write a plurality of media bits on a magnetic recording medium. Magnetic flux in the main pole proceeds through the ABS and into a medium bit layer and soft underlayer (SUL). In related HT18-031, we disclosed how a flux guiding layer (FGL) is FM2 in the aforementioned FM1/spacer/FM2 multilayer, and has a magnetization that is flipped to the opposite direction when current is applied between the MP and trailing shield (TS) and across a spin polarization (SP) layer (FM1) thereby generating spin torque on the FGL. As a result, there is increased reluctance in the write gap so that more magnetic flux from the MP will be concentrated in a direction orthogonal to the ABS to assist writing. Optionally, a FGL may also be formed in the side gaps and leading gap to prevent magnetic flux from leaking from the MP to the side shields and leading shield, respectively. However, an undesirable side effect is that the function of the side shields and leading shield in enhancing cross-track performance and down-track performance, respectively, is weakened. Thus, an improved PMR writer design is needed that enables a writing assist from one or more FGL to boost the write field without comprising tracks per inch (TPI) capability that is a measure of cross-track performance, or without degrading bits per inch (BPI) or down-track performance.

SUMMARY

One objective of the present disclosure is to provide a PMR writer wherein the space adjoining the lead gap (LG) and side gap (SG) that is normally filled with magnetic shields is modified to enable enhanced write performance when a flux guiding device is incorporated in each of the LG and SG.

A second objective of the present disclosure is to provide the PMR writer according to the first objective wherein down-track performance with a stronger write field and improved field gradient is achieved without compromising cross-track performance.

A third objective is to provide a method of forming the PMR writer according to the first and second objectives.

According to one embodiment of the present disclosure, these objectives are achieved with a flux guiding (FG) device that is formed in each of the WG, SG, and LG, and where each FG device comprises a spin polarization (SP) layer adjoining the MP, a first non-magnetic layer (NML1) adjoining the SP layer, a FGL adjoining a side of NML1 that is opposite to the SP layer, and a second non-magnetic layer (NML2) adjoining the FGL. Thus, each FG device has a SP/NML1/FGL/NML2 configuration with an inner SP layer and an outer NML2 where "inner" is defined as a FG device layer closest to the MP, and "outer" is a FG device layer that is farthest from the MP. A key feature is that the side shield (SS) and leading shield (LS) in conventional PM writers are replaced with a non-magnetic conductor (NMC) layer having essentially the same structure in terms of down-track thickness, cross-track width, and height as a typical LS and SS. In the absence of an applied current, the FGL in each FG device has a magnetization that is substantially in the same direction as the gap field flux ($H_{WY}$, $H_{SG}$, and $H_{LG}$, respectively). When a current is applied from the MP and across each FG device to the TS, and to the non-magnetic conductors adjoining the SG and LG, the current is spin polarized by the SP layer and applies a spin torque on the adjacent FGL. Accordingly, FGL magnetization in the FG device in the WG, SG, and LG flips to a direction substantially opposing $H_{WY}$, $H_{SG}$, and $H_{LG}$, respectively, thereby enhancing the write field from the MP to an adjacent magnetic medium. Furthermore, write field gradient is improved in the down-track direction. A greater trailing shield return field provides a gain in bit error rate (BER). The SS stray field is still in the allowable regime, and an increase in erase width in alternating current (AC) mode (EWAC) may be controlled using a higher coercivity magnetic medium.

In an alternative embodiment, only the leading shield is replaced with a non-magnetic conductor layer. Optionally, only each side shield is replaced with a non-magnetic conductor material. Moreover, the present disclosure anticipates that at least one of the LG, SG, and WG do not contain a FG device. The use of a non-magnetic conductor material that is one or more of Ru, Cr, Pd, Pt, Ti, W, and Ta provides more flexibility in designing the PMR writer for protrusion performance (adjusting thermal expansion coefficient and less wear after repeated touchdowns), and for improved corrosion resistance.

Each SP layer and FGL is preferably a single layer or multilayer comprised of $Ni_xFe_{100-x}$, $Co_yFe_{100-y}$, $Co_zNi_{100-z}$, or alloys thereof with B, for example, and with a thickness from 4 to 30 nm, and where x, y, and z are between 0 and 100 atomic %. In other embodiments, one or both of the SP layer and FGL in each FG device is a laminate that is one of $(Co/Ni)_n$, $(CoFe/Ni)_n$, $(Fe/Pt)_n$, and $(Fe/Pd)_n$ where n is a lamination number. NML1 is a spin preserving layer that is one of Cu, Ag, Au, Cr, and Al. NML2 is generally a non-spin preserving layer that is one of Ta, Ru, W, Pt, or Ti.

According to another embodiment, each FG device has a NML2/FGL/NML1/SP configuration where the SP layer is the outer layer and NML2 is the inner layer that contacts the MP. In this case, current is applied from the non-magnetic conductor layer adjoining the LG and each SG, and from the TS across each FG device to the MP. Again, the SP layer spin polarizes the current and applies a spin torque on the FGL that flips FGL magnetization to a direction substantially opposing $H_{WS}$, $H_{SG}$, and $H_{LG}$. The same advantages are achieved compared with the first embodiment. The present disclosure also encompasses alternative embodiments where the LS adjoining the FG device in the LG is retained and only the SS are replaced with the non-magnetic conductor layer, and where the SS are retained and only the LS is replaced with a non-magnetic conductor layer.

A method of forming a PMR writer according to the first embodiment is also provided. A second non-magnetic conductor layer (NMC2) is formed on a first non-magnetic conductor layer (NMC1), and may be comprised of the same or a different conductive material. An opening is formed in NMC2 that exposes a portion of the NMC1 top surface where NMC1 is used to replace a typical LS and NMC2 is used to replace a typical SS. Thereafter, the SP layer, NML1, FGL, and NMC2 are sequentially deposited to form a first FG device stack that partially fills the opening and forms conformal layers. Then, the MP is deposited to fill the remainder of the opening. A planarization step may be used to form a trailing side on the MP that is coplanar with a top surface of the first FG device stack between each MP side and NMC2. As a result, a bottom portion of the first FG device stack is a FG device in the LG ($FG_{LG}$), and each side portion of the first FG device stack is a FG device in the SG ($FG_{SG}$). Thereafter, a second FGL device stack is deposited on the MP trailing side and on NMC2. The second FG device stack is patterned to provide a FG device ($FG_{WG}$) on the MP trailing side before the WG is formed on NMC2. Next, the trailing shield structure is deposited on the $FG_{WG}$, WG, and NMC2. A conventional sequence of steps is then followed to complete the PMR writer structure.

DETAILED DESCRIPTION

Figure 1:
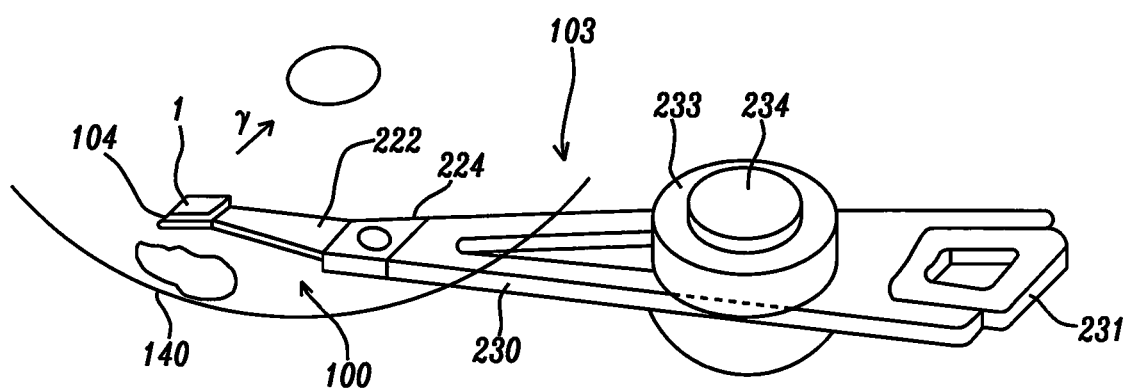
FIG. 1 is a perspective view of a head arm assembly of the present disclosure.

The present disclosure is a PMR writer structure wherein a flux guiding (FG) device having a FGL is formed within each of the WG, SG, and LG to increase reluctance therein when a FGL magnetization is flipped to a direction substantially opposing the gap field flux thereby forcing more magnetic flux from the MP tip at the ABS to enhance the write field, and improve the down-track field gradient and BER. In the drawings, the y-axis is in a cross-track direction, the z-axis is in a down-track direction, and the x-axis is in a direction orthogonal to the ABS and towards a back end of the PMR writer. Thickness refers to a down-track distance, width is a cross-track distance, and height is a distance from the ABS in the x-axis direction. The terms flipping and switching may be used interchangeably when referring to a FGL magnetization. In each FG device, the inner layer is the layer closest to the MP and the outer layer is the layer farthest from the MP. A backside of a layer is a side facing away from the ABS, and a front side faces the ABS.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
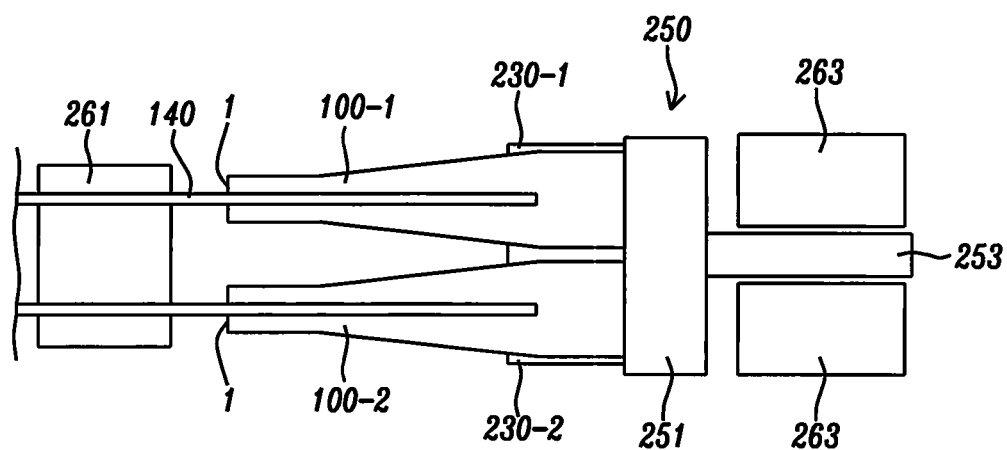
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
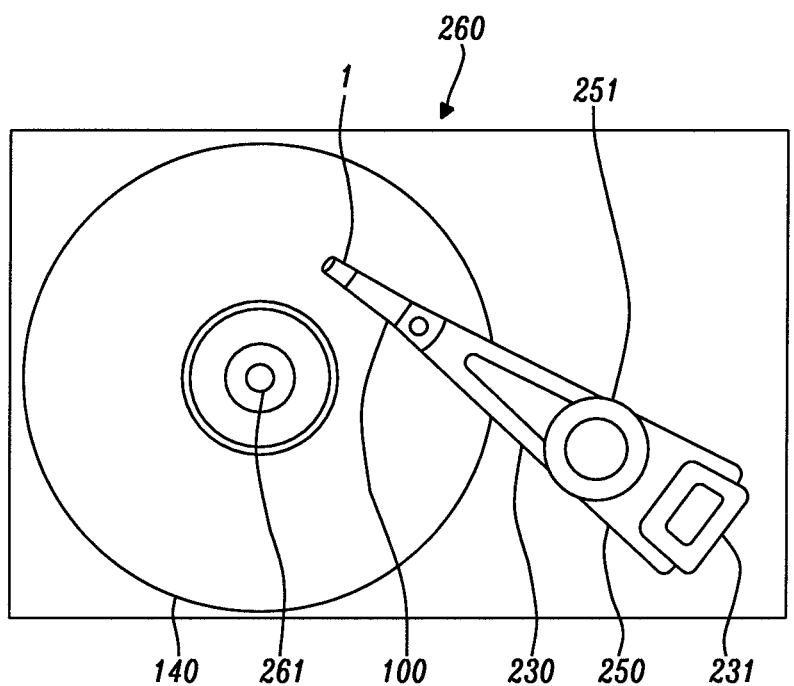
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
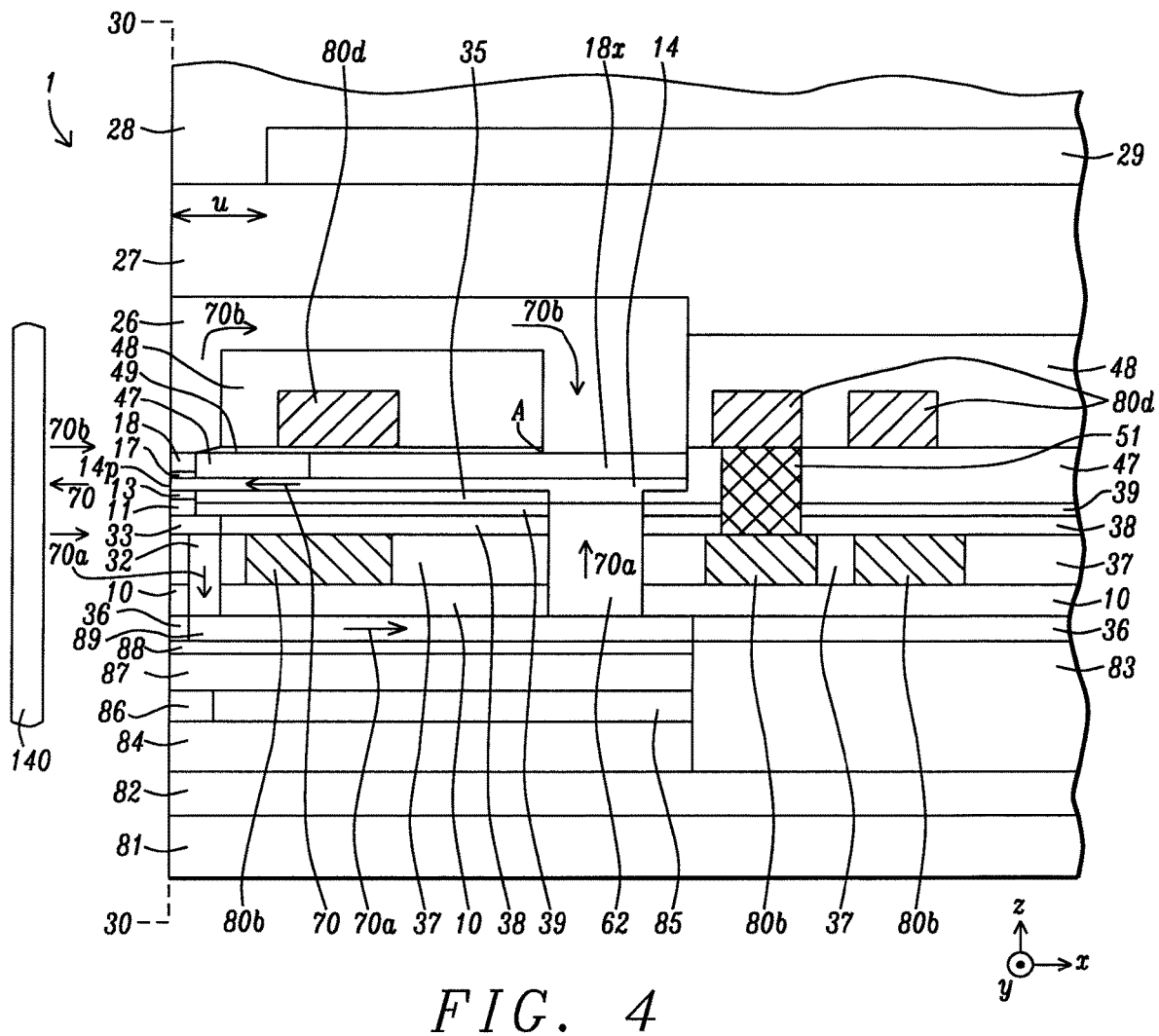
FIG. 4 is a down-track cross-sectional view of a combined read-write head with leading and trailing loop pathways for magnetic flux return to the main pole according to an embodiment of the present disclosure.

Referring to FIG. 4, magnetic recording head 1 comprises a combined read-write head. The down-track cross-sectional view is taken along a center plane (not shown) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) 14 is generated with flowing a current through bucking coil 80*b* and driving coil 80*d* that are below and above the MP, respectively, and are connected by interconnect 51. Magnetic flux 70 exits the MP tip 14*p* at the ABS 30-30 and is used to write a plurality of bits on magnetic medium 140. Magnetic flux 70*b* returns to the MP through a trailing loop comprised of trailing shields 17, 18, PP3 shield 26, and top yoke 18*x*. The leading return loop for magnetic flux 70*a* includes leading shield 11, leading shield connector (LSC) 33, S2 connector (S2C) 32, return path 89, and back gap connection (BGC) 62. The magnetic core may also comprise a bottom yoke 35 below the MP. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is the uppermost layer in the write head.

Figure 5:
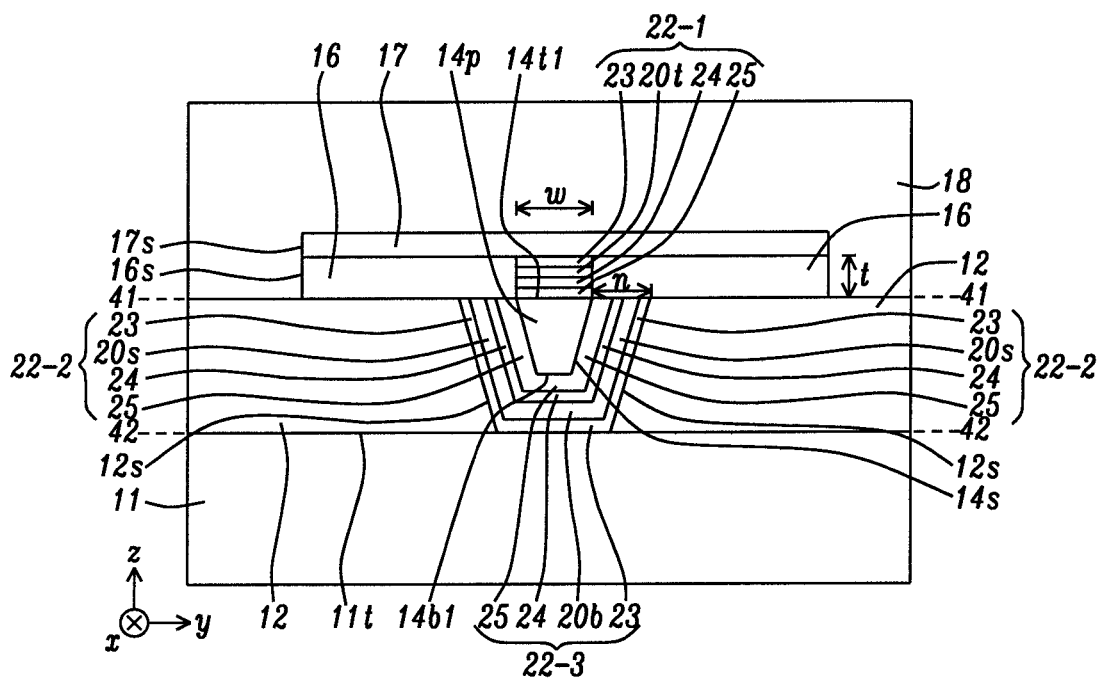
FIG. 5 is an ABS view of an all wrap around (AWA) shield structure surrounding a main pole (MP), and a flux guiding layer (FGL) in each of the gaps around the MP according to a prior art design known to the inventors.

Referring to FIG. 5, a main pole (MP) with MP tip 14*p* having track width w, trailing side 14*t*1, leading side 14*b*1, and two sides 14*s* connecting the leading and trailing sides is shown with an AWA shield structure that was disclosed in related U.S. Pat. No. 10,325,618. There is a WG 16 with thickness t on the MP trailing side, side gaps (SG) 15 of width n adjoining each MP side, and a leading gap (LG) 13 below the MP leading side. The trailing shield (TS) structure comprises a first trailing shield (TS) 17 with a high magnetic saturation value from 19 kiloGauss (kG) to 24 kG on the write gap. The TS structure also includes a second TS 18 formed on the first TS top surface 17*t* and sides 17*s*, on WG sides 16*s*, and on a top surface of the side shields 12 at plane 41-41. Plane 41-41 includes the MP trailing side at the ABS. Side shields contact a top surface of the leading shield 11 at plane 42-42 that is parallel to plane 41-41 and includes the MP leading side at the ABS.

A first FG device 22-1 also known as $FG_{WG}$ is formed in the WG and has a SP/NML1/FGL/NML2 configuration where SP layer 25, NML1 24, FGL 20*t*, and NML2 23 are sequentially formed on MP trailing side 14*t*1, and TS 17 contacts a top surface of NML2. In addition, there is a second FG device 22-2 also called $FG_{SG}$ formed in each SG with an inner SP layer 25, an outer NML2 23 that adjoins SS side 12*s*, and with a FGL 20*s* between NML1 24 and NML2. A third FG device 22-3 also known as $FG_{LG}$ with a SP/NML1/FGL/NML2 configuration is formed in the LG and has an inner SP layer 25, an outer NML2 23 that adjoins LS top surface 11*t*, and a FGL 20*b* between NML1 24 and NML2.

Figure 6:
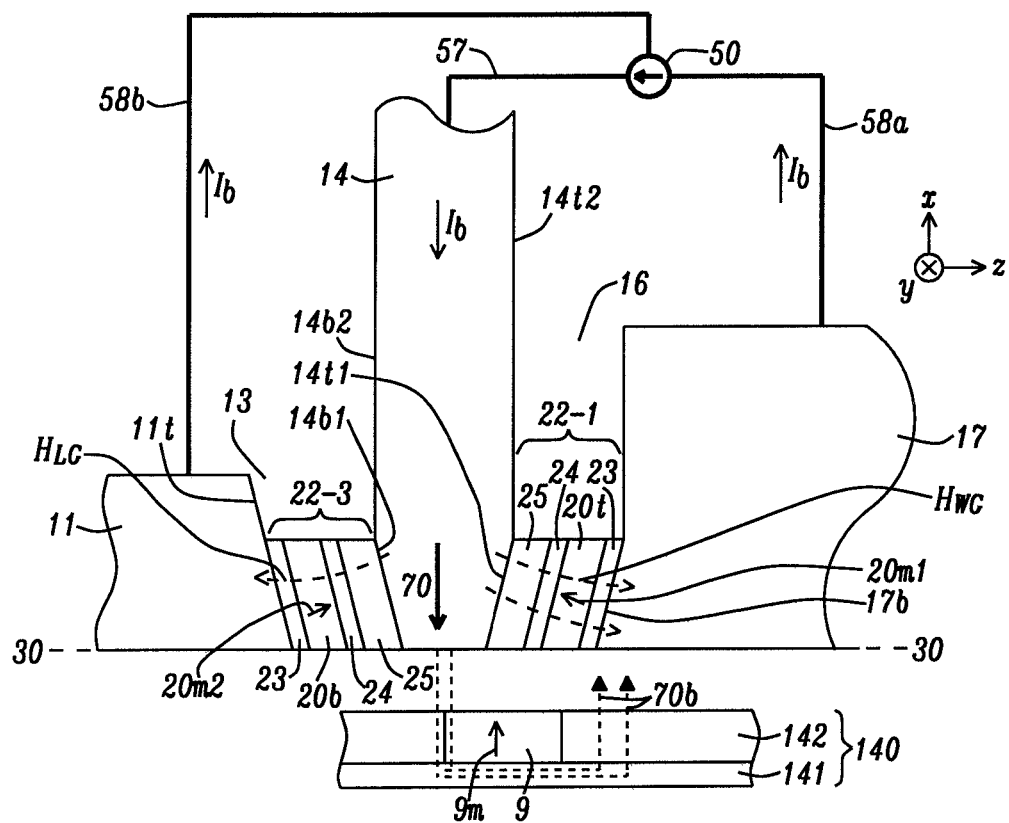
FIG. 6 is a down-track cross-sectional view showing a leading shield (LS) and a TS on opposite sides of the MP in FIG. 5, and where a current is applied from the MP to the LS and TS and across a SP layer to produce spin torque that flips a FGL magnetization in the leading gap and write gap, respectively.

In FIG. 6, a down-track cross-sectional view of the PMR writer in FIG. 5 is illustrated at a plane (not shown) that bisects the MP leading and trailing sides. MP leading side 14*b*1 is tapered and connects with MP bottom surface 14*b*2 that is aligned orthogonal to the ABS 30-30. Moreover, the LS top surface 11*t* may be substantially parallel to the tapered MP leading side. The MP trailing side 14*t*1 is also tapered and connects with MP top surface 14*t*2 that is parallel to the MP bottom surface. First TS 17 has a bottom surface 17*b* that is substantially parallel to the MP trailing side.

In the absence of applied current $I_b$, FGL 20*t* has a magnetization 20*m*1 that is in the general direction of $H_{WG}$, and FGL 20*b* has magnetization 20*m*2 that is in the general direction of $H_{LG}$. However, when current $I_b$ is applied through lead 57 and MP tip 14*p* and across FG device 22-1 to TS 17, and returns to source 50 through lead 58*a*, and when $I_b$ is applied through lead 57 and MP tip 14*p* and across FG device 22-3 to LS 11 and returns to the source through lead 58*b*, then FGL magnetizations 20*m*1 and 20*m*2 flip to a direction substantially opposing $H_{WS}$ and $H_{LG}$, respectively, as a result of spin torque from adjacent SP layer 25. It should be understood that $I_b$ may also be applied from the MP tip to each SS 12 (not shown) to flip a magnetization in FGL 20*s*. As a result, write field 70 is enhanced and a smaller write current is required to switch magnetization 9*m* in magnetic bit 9 in magnetic recording layer 142. The magnetic medium 140 comprises the magnetic recording layer and a soft underlayer (SUL) 141.

Figure 7A:
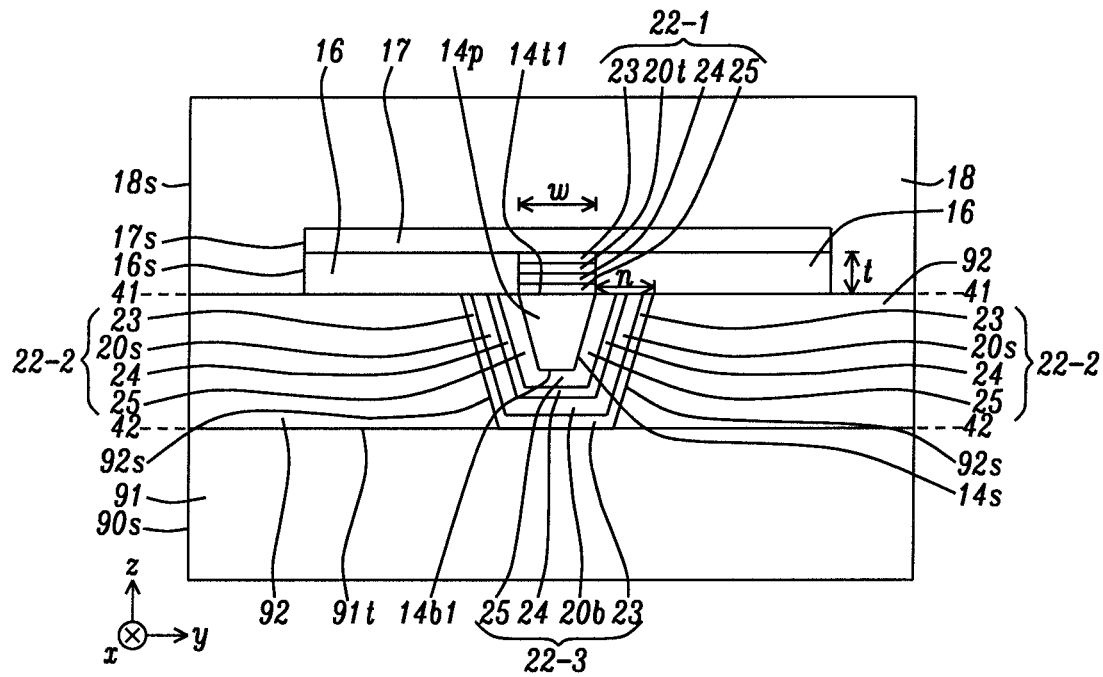
FIG. 7A is an ABS view according to a first embodiment of the present disclosure where a FGL is formed in each of the write gap (WG), leading gap (LG), and side gaps (SG), and a non-magnetic conductor replaces each of the side shields and the leading shield.

Referring to FIG. 7A, a first embodiment of the present disclosure is depicted and retains all the features of the PMR writer in FIG. 5 except LS 11 is replaced with a first non-magnetic conductor (NMC1) layer 91 having an inner side that contacts NML2 23 in FG device 22-3, and each side shield 12 is replaced with a second non-magnetic conductor (NMC2) layer 92 having an inner side that adjoins NML2 23 in FG device 22-2. According to one embodiment, each of SP layer 25, NML1 24, and NML2 in FG device 22-3 forms a continuous layer with adjoining SP layer 25, NML1 24, and NML2, respectively, in each FG device 22-2, and FGL 20*b* forms a continuous layer with each FGL 20*s*. Preferably, the layers in FG devices 22-2 and 22-3 are conformal to the shape of the NMC2 inner sides and NMC1 top surface. In related patent application HT19-004, we disclose alternative shapes for the FG devices, MP, and side shields that enable a shallower side gap angle between the NMC2 inner side and NMC1 top surface, which in turn allows the layers in FG devices 22-2 and 22-3 to have a more uniform thickness.

NMC1 layer 91, and NMC2 layer 92 are preferably one or more of Ru, Cr, Pd, Pt, Ti, W, and Ta, and provide one or more benefits such as improved resistance to wear during repeated touchdowns, better resistance to corrosion, and a different thermal expansion coefficient for more flexibility in adjusting WG protrusion compared with magnetic materials such as FeCo, FeCoN, FeCoNi, and NiFe that are used as SS and LS in prior art schemes. Note that the shape and dimensions of the NMC1 and NMC2 layers in terms of down-track thickness, cross-track width, and height of a backside from the ABS may be essentially the same as the shape and dimensions of a LS and SS in conventional PMR writers. Accordingly, NMC1 layer 91 contacts NMC2 layer 92 at plane 42-42, and a top surface of NMC2 layer 92 adjoins WG 16 and second TS 18 at plane 41-41. Moreover, an outer side 90*s* of NMC1 layer 91 is coplanar with side 18*s* of the second TS.

Each of the SP layer 25 and FGL 20*t*, 20*s*, and 20*b* in FG device 22-1, 22-2, and 22-3, respectively, is preferably a single layer or multilayer comprised of one or more of $Ni_xFe_{100-x}$, $Co_yFe_{100-y}$, $Co_zNi_{100-z}$, or alloys thereof with B, for example, where each of x, y, and z is from 0 to 100 atomic %, or is a laminate such as $(Co/Ni)_n$, $(CoFe/Ni)_n$, (Fe/Pt)$_n$, and (Fe/Pd)$_n$ where n is a lamination number. NML1 is a spin preserving layer that is one of Cu, Ag, Au, Cr, and Al. NML2 is a non-spin preserving layer that is one of Ta, Ru, W, Pt, or Ti. Optionally, NML2 in FG devices 22-2 and 22-3 may be omitted when the adjoining NMC1 and NMC2 are also made of a non-spin preserving material.

According to one embodiment, FG device 22-1 within WG 16 has a thickness t equal to the write gap thickness, and a width that is preferably equal to the track width w of the MP trailing side 14t1 at the ABS. A backside of the FG device may be a throat height (TH) behind the ABS, but in other embodiments may have a height less than TH. In exemplary embodiments, t is preferably from 4 nm to 30 nm. In a preferred embodiment, FG device 22-2 within each SG has a width n essentially equal to the SG width, and FG device 22-3 has a thickness essentially equal to the LG thickness.

Figure 7B:
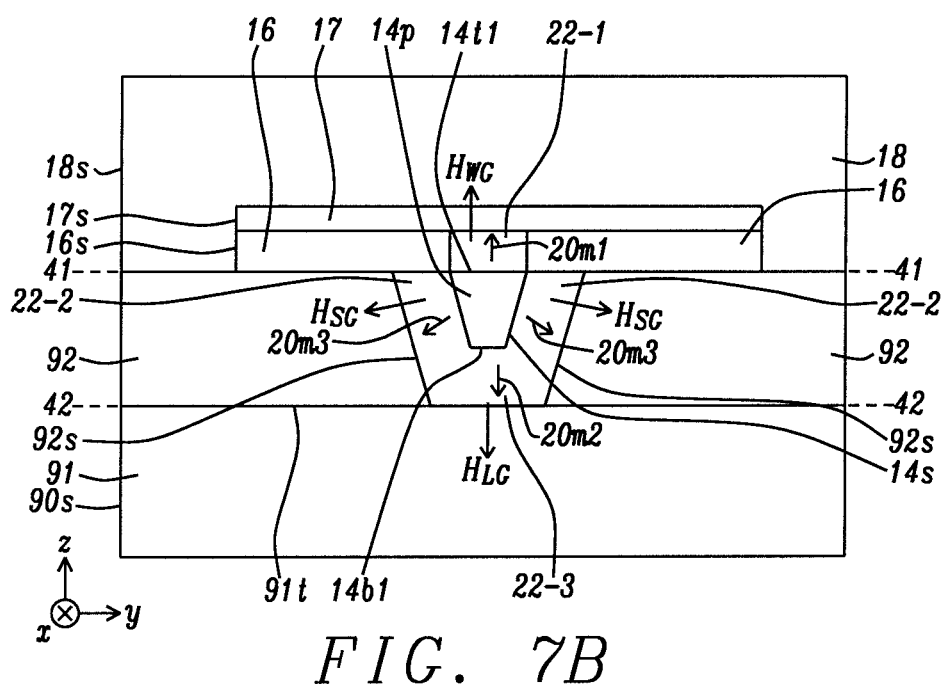
FIG. 7B is an ABS view showing that a FGL magnetization in each of the WG, LG, and SG is in substantially the same direction as the WG flux field ($H_{WY}$), LG flux field ($H_{LG}$), and SG flux field ($H_{SG}$) in the absence of an applied current.

Referring to FIG. 7B, individual layers in each FG device are not shown in order to more clearly depict gap flux fields H$_{WS}$, H$_{SG}$, and H$_{LG}$, and to show that FGL 20t has magnetization 20m1 substantially parallel to H$_{WS}$ in the absence of an applied current across FG device 22-1, and each FGL 20s has magnetization 20m3 substantially parallel to H$_{SG}$ in the absence of applied current across FG device 22-2, and FGL 20b has magnetization 20m2 substantially parallel to H$_{LG}$ in the absence of an applied current across FG device 22-3.

Figure 7C:
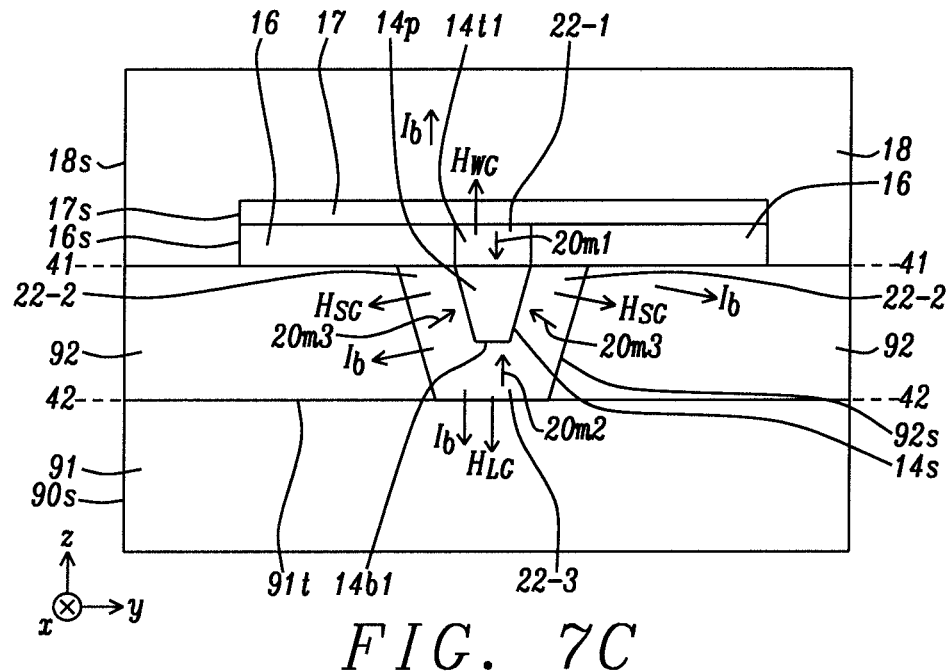
FIG. 7C is an ABS view depicting a flip in each of the FGL magnetizations in FIG. 7B to a direction substantially opposing $H_{WY}$, $H_{LG}$, and $H_{SG}$ when a current ($I_b$) is applied from the MP to each of the TS, and non-magnetic conductors adjoining the LG and SG, respectively.

As shown in FIG. 7C, when a current I$_b$ of sufficient density, preferably in a range of $1\times10^{-7}$ to $1\times10^{-9}$ Amp/cm$^2$, is applied from MP tip 14p across FG device 22-1 to first TS 17, and from the MP tip across each FG device 22-2 to a NMC2 layer 92, and from the MP tip across FG device 22-3 to NMC1 layer 91, then magnetizations 20m1, 20m3, and 20m2 flip to a direction substantially opposing H$_{WS}$, H$_{SG}$, and H$_{LG}$, respectively, as a result of spin torque from SP layer 25 that is applied to FGL 20t, FGL 20s, and FGL 20b, respectively. It should be understood that each of the aforementioned magnetizations after flipping has a precessional state (oscillation) described in related U.S. Pat. No. 10,424,326, and depending on the cone angle of the oscillation, the FG device may provide both of an increased reluctance in the gaps to enhance the write field, and generate a radio frequency (RF) field on the magnetic medium to provide a microwave assisted magnetic recording (MAMR) effect by lowering the write field required to switch one or more magnetic bits. As current I$_b$ increases, the cone angle decreases and approaches 0 degrees (orthogonal to the MP trailing side in the WG, orthogonal to a MP side in the SG, and orthogonal to the MP leading side in the LG) to provide a maximum boost to the write field, but where the MAMR effect is effectively absent.

The present disclosure also encompasses other embodiments relating to FG device structure. For example, related U.S. Pat. No. 10,424,326 discloses that a second SP layer (in a synthetic antiferromagnetic or SAF configuration) may be included on an opposite side of the FGL with respect to the first SP layer for the benefit of reducing the I$_b$ current density needed to flip the FGL magnetization. In other embodiments, the SP layer 25 in FG device 22-1 may be omitted and a portion of the MP tip proximate to MP trailing side 14t1 may spin polarize the current I$_b$ in the WG to apply spin torque to FGL 20t. Also, SP layer 25 in FG device 22-3 may be omitted and a portion of the MP tip proximate to MP leading side 14b1 may spin polarize I$_b$ in the LG to apply spin torque to FGL 20b. Likewise, SP layer 25 in each FG device 22-2 is optional when a portion of the MP tip proximate to MP side 14s is used to spin polarize I$_b$ across the SG. Related patent application Ser. No. 16/372,517 describes alternative embodiments where the FG devices in each of the WG, SG, and LG may be recessed from the ABS to reduce wear while still providing performance advantages.

Figure 8:
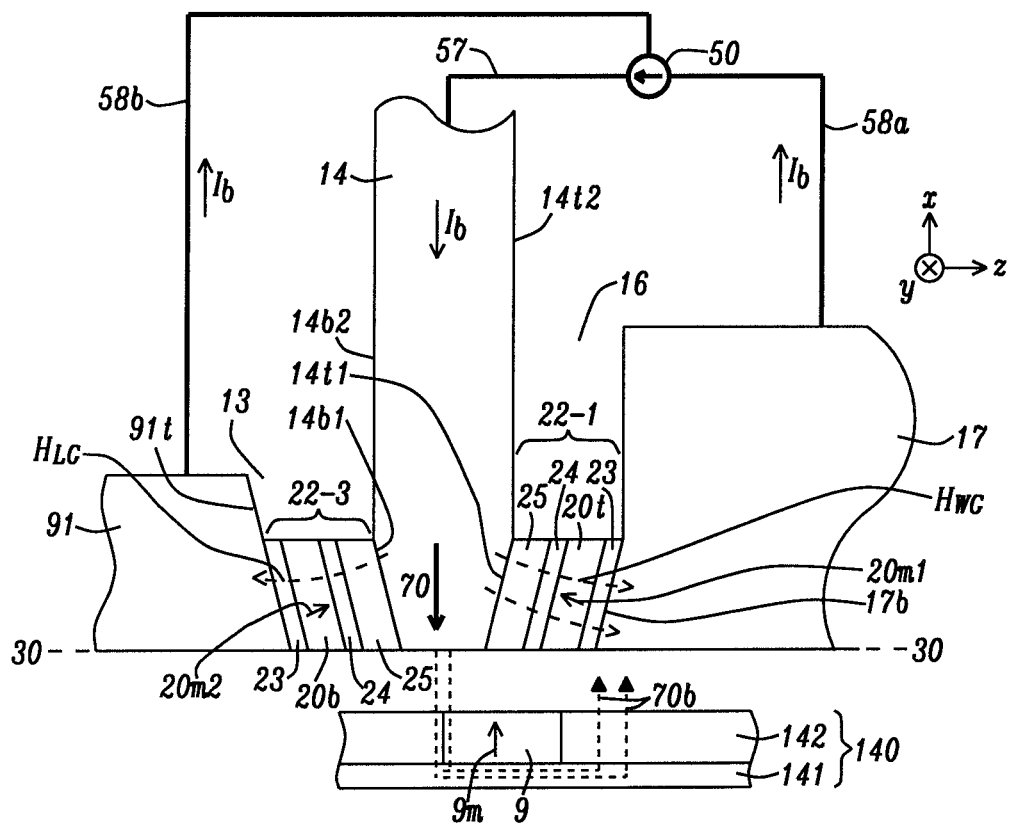
FIG. 8 is a down-track cross-sectional view of the PMR writer structure in FIG. 7C at a center plane that bisects the MP trailing and leading sides.

Referring to FIG. 8, a down-track cross-sectional view is shown at a plane that bisects MP trailing side 14t1 and MP leading side 14b1 in FIG. 7C. The scheme differs from that previously described with respect to FIG. 6 in that NMC1 layer 91 replaces LS 11. Moreover, NMC2 layer 92 (not shown) replaces each SS 12. In the exemplary embodiment, a portion of WG 16 remains behind FG device 22-1 and between MP top surface 14t2 and first TS 17, and a portion of LG 13 remains behind FG device 22-3 and between the NMC1 layer and MP bottom surface 14b2. A front side of each of the aforementioned FG devices is at the ABS 30-30.

Figure 9:
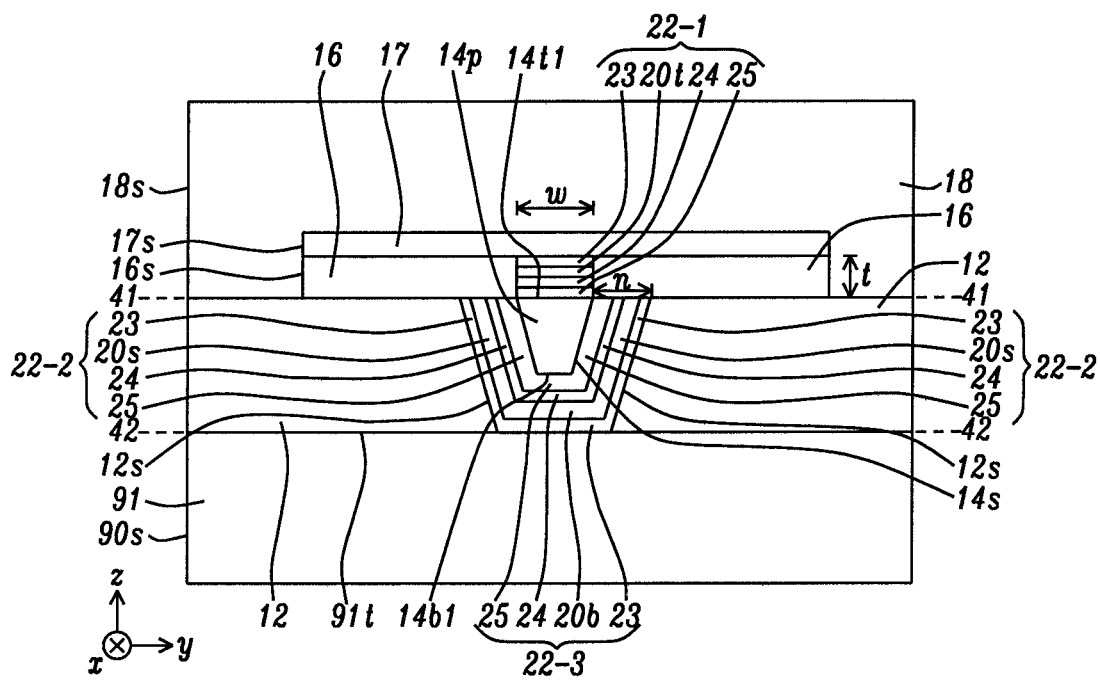
FIG. 9 is an ABS view according to a second embodiment of the present disclosure where all the features of the first embodiment are retained except the non-magnetic conductor adjoining each SG is replaced with a side shield.

Referring to FIG. 9, a second embodiment of the present disclosure is illustrated from an ABS view and retains all the features of the first embodiment except magnetic side shields 12 are employed instead of NMC2 layer 92 adjoining FG device 22-2 in each SG. Thus, only LS 11 in FIG. 5 is replaced with a NMC material that is NMC1 layer 91.

Figure 10:
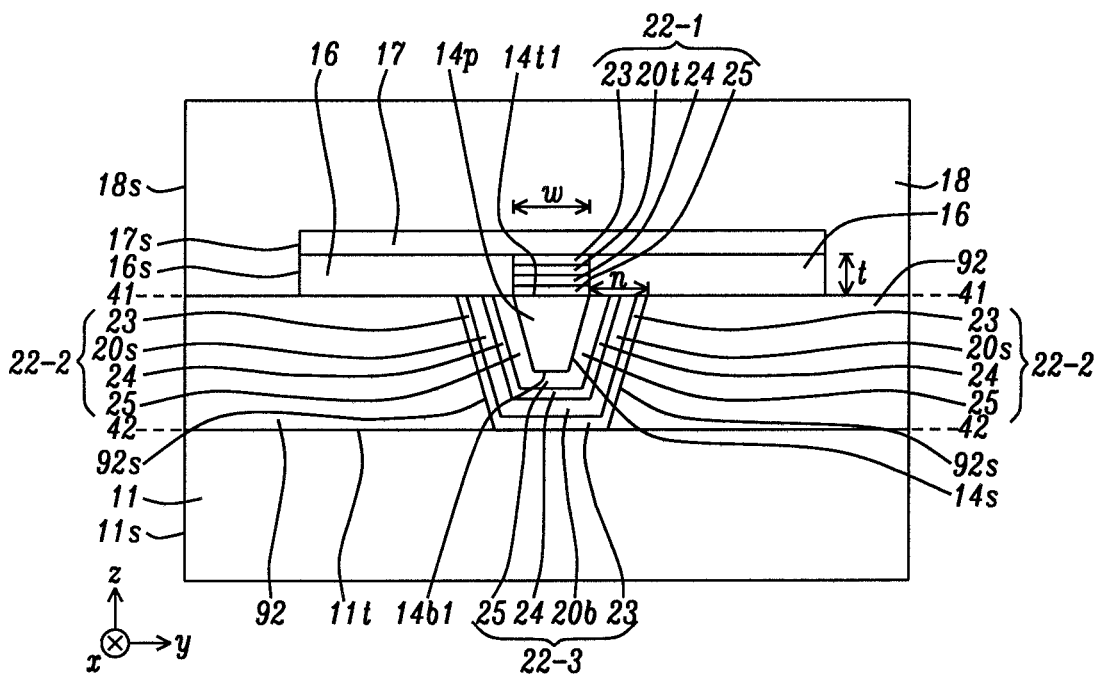
FIG. 10 is an ABS view according to a third embodiment of the present disclosure where all the features of the first embodiment are retained except the non-magnetic conductor adjoining the LG is replaced with a leading shield.

The present disclosure also encompasses a third embodiment depicted in FIG. 10 that represents a modification of the first embodiment. In particular, all features are retained from the first embodiment except LS 11 is employed rather than NMC1 layer 91 adjoining FG device 22-3 in the LG. Accordingly, each SS 12 in FIG. 5 is replaced with a NMC2 layer 92.

Figure 11:
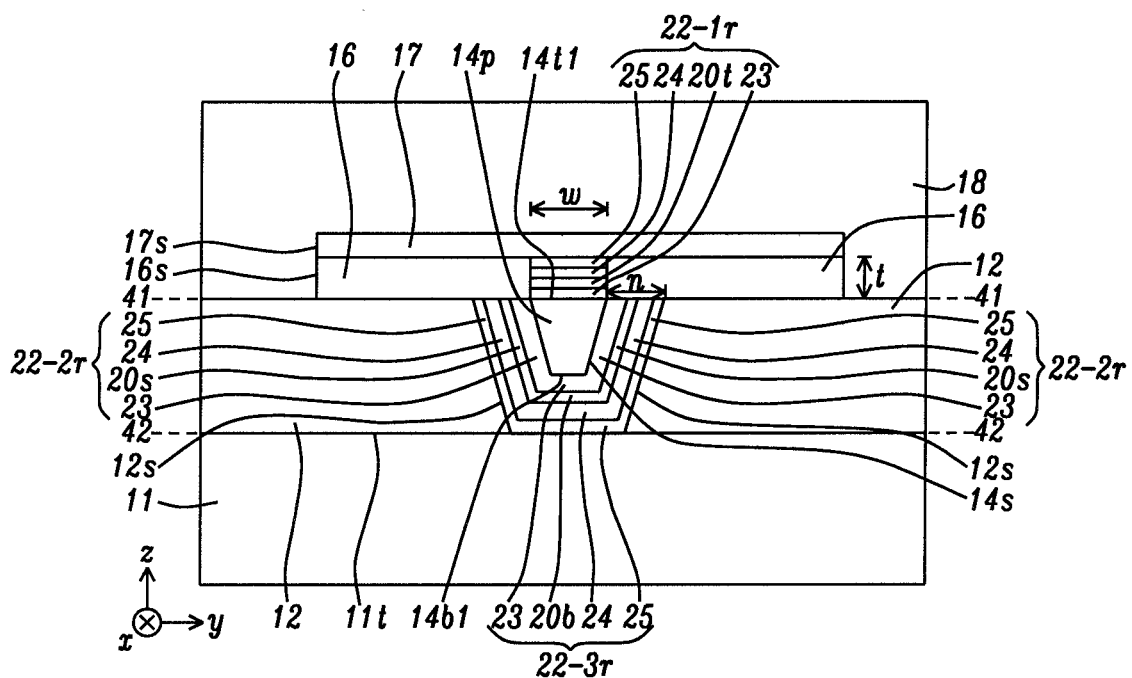
FIG. 11 is an ABS view of an AWA shield structure surrounding a MP, and a FGL in each of the gaps around the MP according to a second prior art design known to the inventors.

Referring to FIG. 11, a second PMR writer design known to the inventors and that incorporates a FG device in each of the WG, SG, and LG is illustrated from an ABS view. The AWA shield structure comprised of LS 11, SS 12, first TS 17, and second TS 18 is retained from FIG. 5. Moreover, all aspects of the FG devices described previously related to composition and dimensions are maintained. However, a key difference from the earlier PMR writer design is that the ordering of FG device layers is reversed. As a result, FG device 22-1r (also referred to as FG$_{LG}$) is formed in WG 16 and has a NML2/FGL/NML1/SP configuration wherein an inner NML2 23 is formed on MP trailing side 14t1, SP layer 25 contacts first TS 17, and FGL 20t is sandwiched between NML1 24 and NML2. FG device 22-2r (also known as FG$_{SG}$) in each SG has an inner NML2 23 adjoining a MP side 14s, an outer SP layer 25 contacting an inner side 12s of SS 12, and FGL 20s sandwiched between NML1 24 and NML2. Furthermore, FG device 22-3r (also referred to as FG$_{LG}$) in the LG has an inner NML2 23 contacting MP leading side 14b1, an outer SP layer 25 adjoining LS top surface 11t, and FGL 20b between NML1 24 and NML2.

Figure 12:
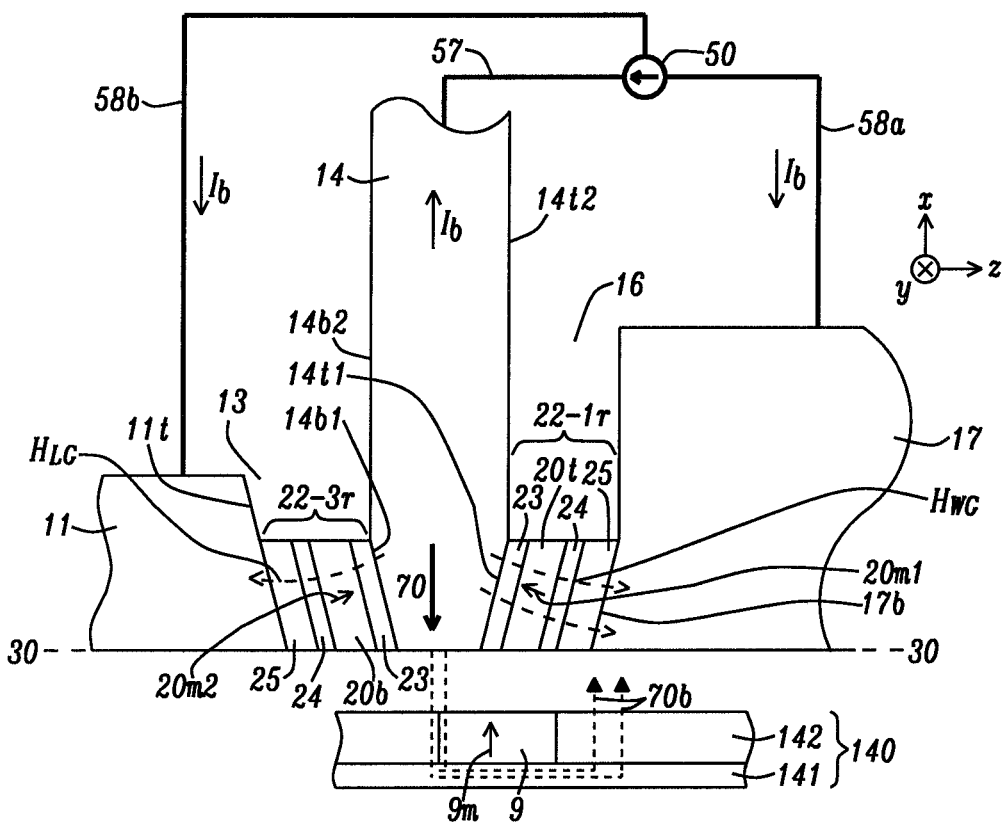
FIG. 12 is a down-track cross-sectional view showing the LS and TS on opposite sides of the MP in FIG. 11, and where a current is applied from each of the LS and TS and across a SP layer to the MP to flip a FGL magnetization in the leading gap and write gap, respectively.

In FIG. 12, a down-track cross-sectional view of the PMR writer in FIG. 11 is illustrated at a plane (not shown) that bisects the MP leading and trailing sides. LS top surface 11t may be substantially parallel to the tapered MP leading side 14b1, and TS bottom surface 17b is substantially parallel to the MP trailing side 14t1. In the absence of an applied current, FGL 20t has a magnetization 20m1 that is in the general direction of H$_{WG}$, and FGL 20b has magnetization 20m2 that is in the general direction of H$_{LG}$. However, when current I$_b$ is applied through lead 58a and TS 17 and across FG device 22-1 to MP tip 14p, and returns to source 50 through lead 57, and when I$_b$ is applied through lead 58b and LS 11 and across FG device 22-3 to MP tip 14p and returns to the source through lead 57, then FGL magnetizations 20m1 and 20m2 flip to a direction substantially opposing H$_{WG}$ and H$_{LG}$, respectively, as a result of spin torque from adjacent SP layer 25. Moreover, I$_b$ may also be applied from each SS 12 (not shown) across FG device 22-2 to flip a magnetization in FGL 20s. As a result, write field 70 is enhanced and a smaller write current is required to switch magnetization 9m in magnetic bit 9 in magnetic recording layer 142 within magnetic medium 140.

Figure 13A:
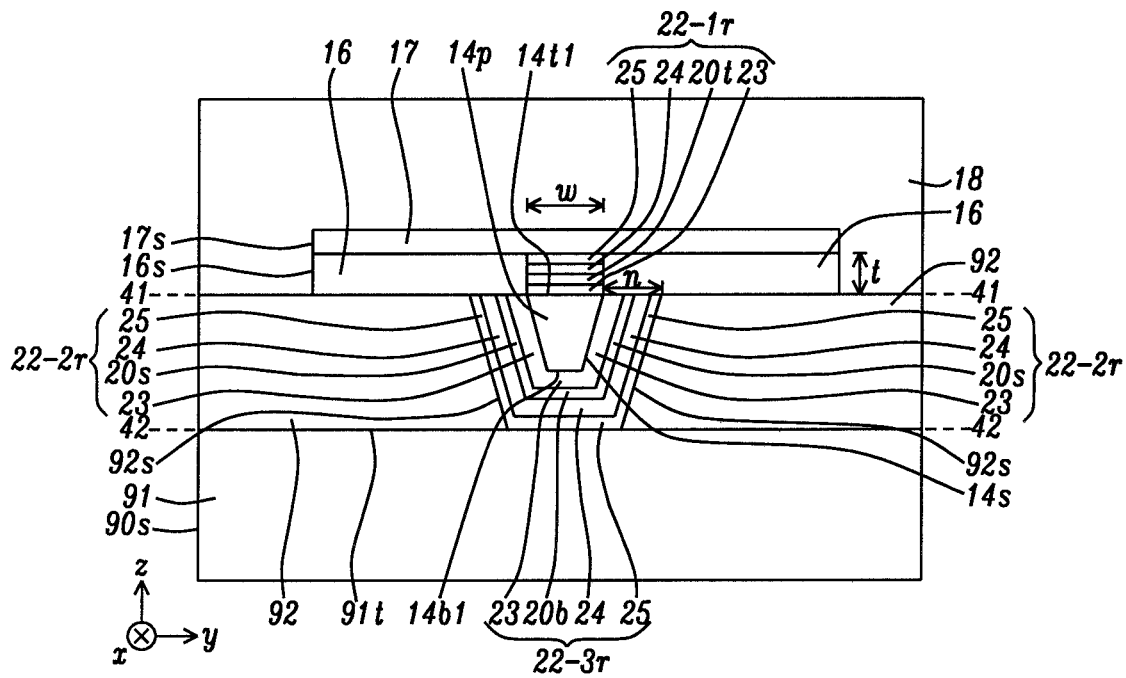
FIG. 13A is an ABS view according to a fourth embodiment of the present disclosure where a FGL is formed in each of the WG, LG, and SG, and a non-magnetic conductor replaces each of the side shields and the leading shield.

Referring to FIG. 13A, a fourth embodiment of the present disclosure is depicted and retains all the features of the PMR writer in FIG. 11 except LS 11 is replaced with a first non-magnetic conductor (NMC1) layer 91 that contacts SP layer 25 in FG device 22-3r, and each side shield 12 is replaced with a second non-magnetic conductor (NMC2) layer 92 having an inner side that adjoins SP layer 25 in FG device 22-2r. According to one embodiment, each of SP layer 25, NML1 24, and NML2 in FG device 22-3r forms a continuous layer with adjoining SP layer 25, NML1 24, and NML2, respectively, in each FG device 22-2r, and FGL 20b forms a continuous layer with each FGL 20s.

Figure 13B:
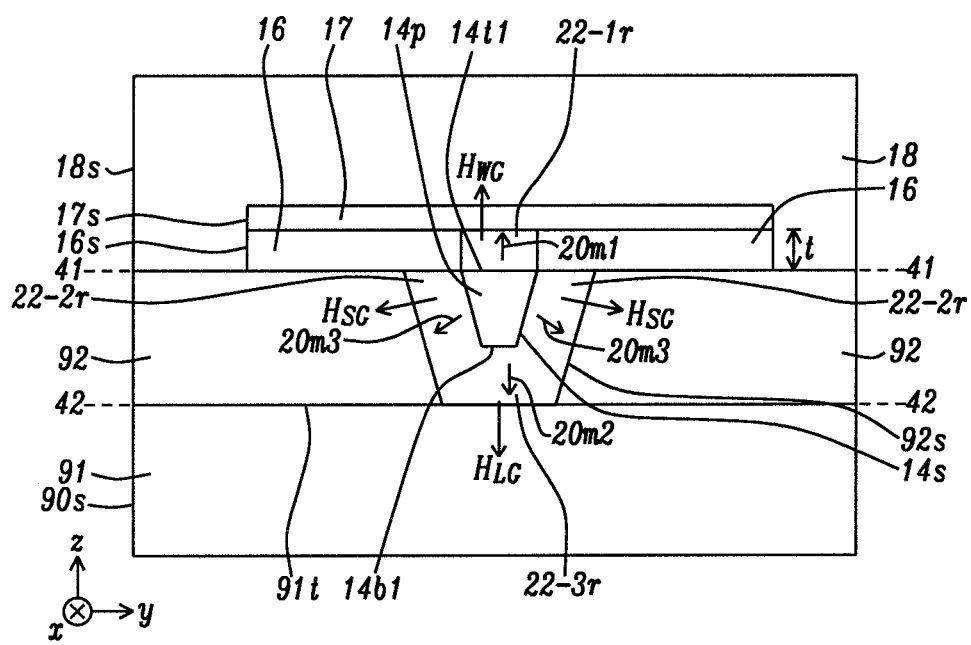
FIG. 13B is an ABS view showing that the FGL magnetization in each of the WG, LG, and SG is aligned in substantially the same direction as the $H_{WG}$, $H_{LG}$, and $H_{SG}$ in the absence of an applied current.

In FIG. 13B, individual layers in each FG device are not shown in order to more clearly depict gap flux fields $H_{WG}$, $H_{SG}$, and $H_{LG}$, and to show that FGL 20t has magnetization 20m1 substantially parallel to $H_{WS}$ in the absence of an applied current across FG device 22-1r, and each FGL 20s has magnetization 20m3 substantially parallel to $H_{SG}$ in the absence of applied current across FG device 22-2r, and FGL 20b has magnetization 20m2 substantially parallel to $H_{LG}$ in the absence of an applied current across FG device 22-3r.

Figure 13C:
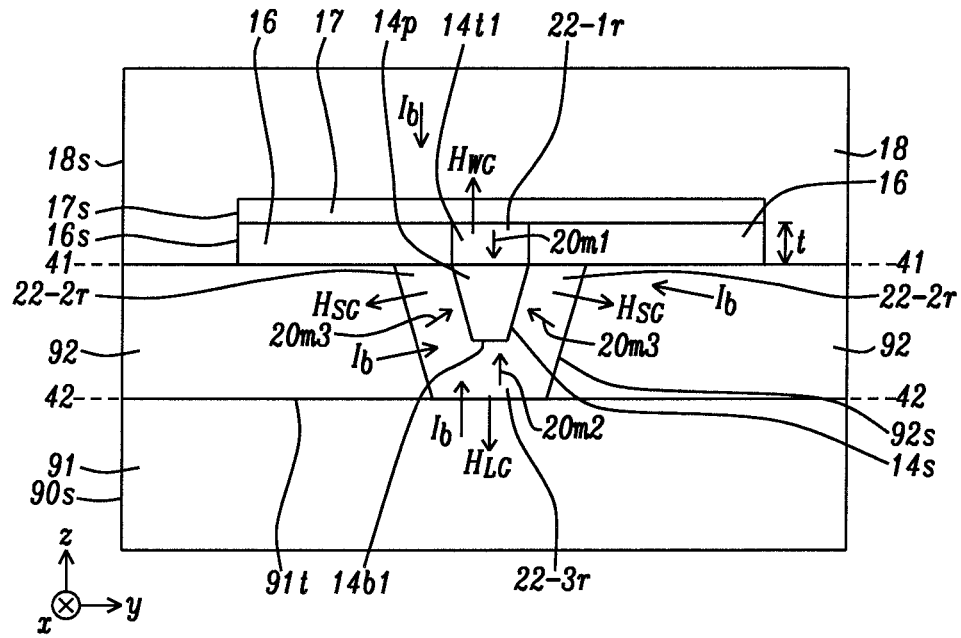
FIG. 13C is an ABS view depicting a flip in each of the FGL magnetizations in FIG. 13B to a direction substantially opposing $H_{WS}$, $H_{LG}$, and $H_{SG}$ when a current ($I_b$) is applied from each of the TS, and non-magnetic conductors adjoining the LG and SG, respectively, to the MP.
Figure 14:
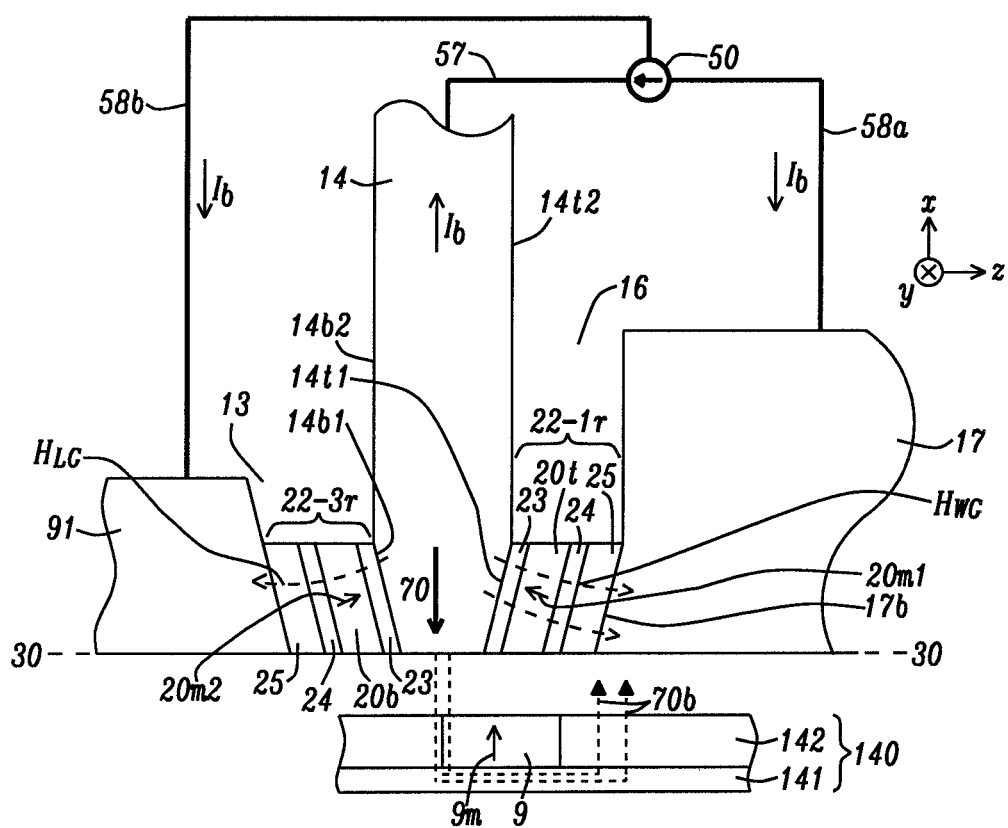
FIG. 14 is a down-track cross-sectional view of the PMR writer structure in FIG. 13C at a center plane that bisects the MP trailing and leading sides.

As shown in FIG. 13C, when a current $I_b$ of sufficient density is applied from first TS 17 across FG device 22-1r to MP tip 14p, and from NMC2 layer 92 across each FG device 22-2r to the MP tip, and from NMC1 layer 91 across FG device 22-3r to the MP tip, then magnetizations 20m1, 20m3, and 20m2 flip to a direction substantially opposing $H_{WS}$, $H_{SG}$, and $H_{LG}$, respectively, as a result of spin torque applied from SP layer 25 to FGL 20t, FGL 20s, and FGL 20b, respectively. As mentioned previously, each of the aforementioned magnetizations after flipping has a precessional state, and depending on the cone angle of the oscillation, the FG device may provide both of an increased reluctance in the gaps to enhance the write field, and generate a radio frequency (RF) field on the magnetic medium to provide a microwave assisted magnetic recording (MAMR) effect by lowering the write field required to switch one or more magnetic bits. As current $I_b$ increases, the cone angle decreases and approaches 0 degrees to provide a maximum boost to the write field, but where the MAMR effect is effectively absent.

The present disclosure is not limited to the FG device structure depicted in FIG. 13A. As mentioned earlier, a second SP layer in a SAF configuration may be included on an opposite side of one or more of FGL 20t, FGL 20s, and FGL 20b with respect to the first SP layer as disclosed in related U.S. Pat. No. 10,424,326. In other embodiments, the SP layer 25 in FG device 22-1r may be omitted and a portion of first TS 17 proximate to bottom surface 17b may spin polarize the current $I_b$ in the WG to apply spin torque to FGL 20t. Also, SP layer 25 in FG device 22-3r may be omitted and a portion of the LS proximate to LS top surface 11t may spin polarize $I_b$ in the LG to apply spin torque to FGL 20b. Likewise, SP layer 25 in each FG device 22-2r is optional when a portion of SS 12 proximate to inner side 12s is used to spin polarize $I_b$ across the SG. In addition, the FG device in one or more of the WG, SG, and LG may be recessed from the ABS to reduce wear while still providing the desired performance advantages.

Figure 15:
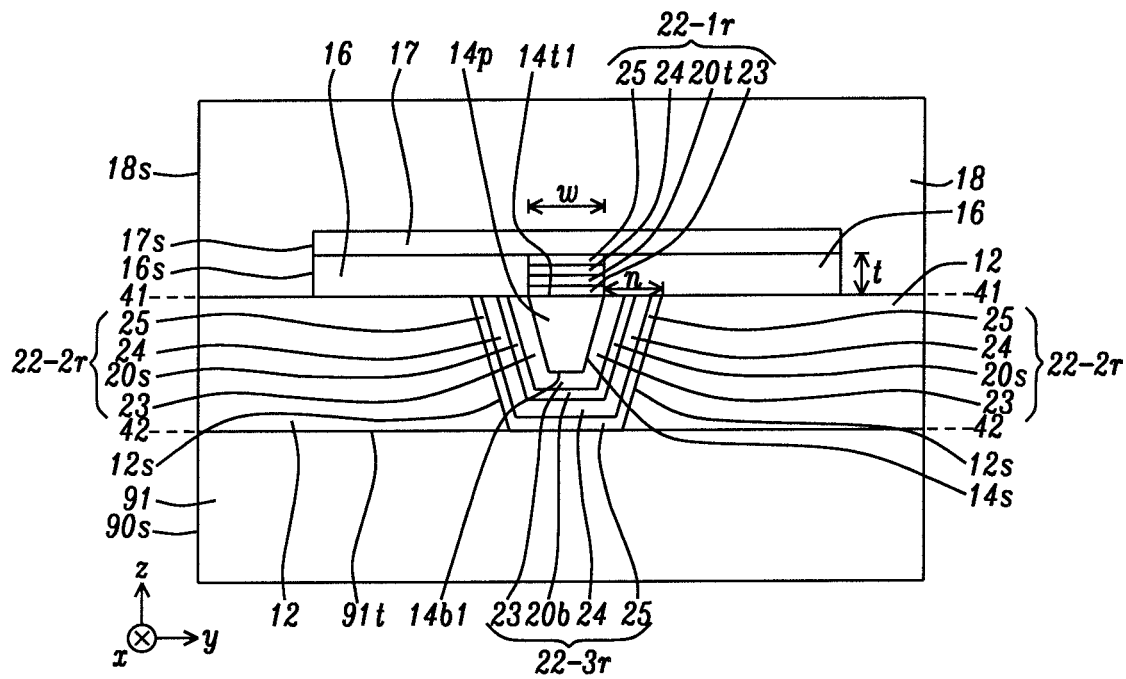
FIG. 15 is an ABS view according to a fifth embodiment of the present disclosure where all the features of the second embodiment are retained except the non-magnetic conductor adjoining each SG is replaced with a side shield.

Referring to FIG. 15, a fifth embodiment of the present disclosure is illustrated from an ABS view and retains all the features of the fourth embodiment except magnetic side shields 12 are employed instead of NMC2 layer 92 adjoining FG device 22-2r in each SG. Thus, only LS 11 in FIG. 11 is replaced with a NMC material that is NMC1 layer 91, and SS 12 adjoins a top surface of NMC1 layer 91 at plane 42-42.

Figure 16:
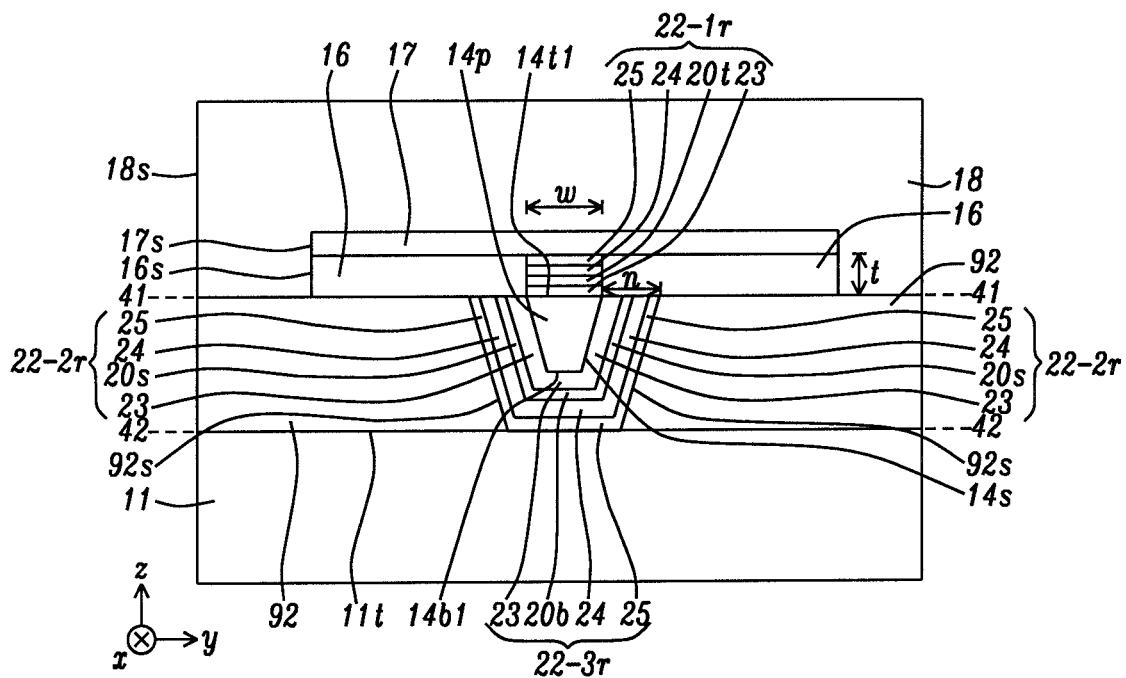
FIG. 16 is an ABS view according to a sixth embodiment of the present disclosure where all the features of the fourth embodiment are retained except the non-magnetic conductor adjoining the LG is replaced with a leading shield.

According to a sixth embodiment in FIG. 16 that is a modification of the fourth embodiment, all features are retained from the fourth embodiment except LS 11 is employed rather than NMC1 layer 91 adjoining FG device 22-3r in the LG. Accordingly, each SS 12 in FIG. 11 is replaced with a NMC2 layer 92 where the NMC2 layer contacts a LS top surface 11t at plane 42-42.

Each flux guiding element described herein provides the same benefit of effectively reducing one of the gap fields $H_{WS}$, $H_{SG}$, and $H_{LG}$ and thereby increasing reluctance in the WG 16, SG 15, and LG 13, respectively. The magnitude of current $I_b$ needed to flip magnetization 20m1 may be different from that required to flip magnetizations 20m2, 20m3 depending on the thickness of each layer in FG devices 22-1, 22-2, and 22-3 (or in 22-1r, 22-2r, and 22-3r) and the distance of FGL 20t, FGL 20s, and FGL 20b from MP tip 14p. Note that each gap field $H_{WS}$, $H_{SG}$, and $H_{LG}$, and applied current are generally oriented orthogonal to each MP tip side 14t1, 14s, and 14b1, respectively.

In order for the FG devices to have acceptable reliability, the magnitude of current $I_b$ must be maintained as low as possible since excessive current may cause degradation of one or more layers in the FG devices due to electromigration and/or excessive local heating. In embodiments described herein, each FG device has a backside at a height from the ABS that is about the throat height of the respective shield or of NMC1 and NMC2 when a non-magnetic layer replaces a SS or LS. A smaller FG device height could also be used in cases when the throat height of the shield, NMC1, and NMC2 is larger than 50 nm. It should be understood that the electrical current direction required for the FG devices to perform as designed is from SP layer→spin preserving layer→FGL→non-spin preserving layer where the SP layer in $FG_{WG}$ adjoins either the MP tip 14p or first TS 17, and the SP layer in $FG_{SG}$ adjoins either the MP tip or NMC2 (or SS 12), and the SP layer in $FG_{LG}$ contacts either the MP tip or NMC1 (or LS 11). In other words, the current $I_b$ direction is independent of the gap field direction. In fact, the current direction stays the same when the gap fields, write field 70, and return field 70b are switched to the opposite direction in order to write a transition.

Another advantage of the present disclosure is that leading shield spacing is merged to the backside of the NMC1 layer, which means LS height etching that is critical in conventional PMR writer fabrication methods, is no longer relevant. There is still a need to have an insulating layer at the corners of the MP trailing side and contacting the backsides of the FG devices so that the only electrical contact between the MP tip and the first TS, NMC1, and NMC2 is through a FG device. However, the physical boundaries between the NMC1 and NMC2 layers and an adjoining insulating layer are not of magnetic significance unlike the boundaries between the LS and SS and their adjoining insulating layers.

A modeling experiment was performed to demonstrate the benefits of the present disclosure where both of the side shields and leading shield are replaced with a non-magnetic conductor layer. Table 1 below summarizes the performance results of a PMR writer according to an embodiment of the present disclosure compared with a conventional PMR writer having a LS and SS. When replacing the LS and SS in a conventional PMR writer with NMC1 and NMC2 layers, we find that the vertical write (Hy) field from the MP increases by 10% as shown in row 2 vs. row 1 results. However, EWAC is 30% wider, which means a significantly lower TPI capability, and a sign of weaker cross-track robustness. The SS stray field is also larger by a factor of 2.5 thereby significantly degrading the recording property. Row 3 represents the design depicted in FIG. 5 and results indicate that with FG devices in the gaps around the MP, the MP write field is 80% larger. Although EWAC is increased to about 72 nm, one can choose a magnetic medium with a higher coercive field since Hy is higher than in prior art schemes. With a high coercivity magnetic medium, a 5000 Oe field can no longer overwrite the track signal, but when the write field is increased by 80% to 9000 Oe, the erase width is expected to drop to an acceptable level for the Row 3 PMR writer structure. The SS stray field at −203 Oe is in an ideal regime.

TABLE 1

FEM simulation results for various PMR writer configurations

| PMR writer structure | EWAC/ nm @ 5000 Oe | Hy Field (Oe) | TS Return Field (Oe) | SS Stray Field (Oe) |
| --- | --- | --- | --- | --- |
| Conventional PMR with AWA shields (TS, SS, LS) | 47.90 | 7077.89 | −259.11 | 906.15 |
| PMR with TS but SS and LS are replaced with NMC layers | 62.91 | 7732.33 | −640.80 | 2300.77 |
| AWA shields with FG devices in WG, LG, SG (FIG. 5) | 71.55 | 12725.99 | −512.18 | −203.33 |
| TS (LS, SS replaced by NMC) + FG dev. in WG, LG, SG (FIG. 7A) | 73.43 | 12768.48 | −999.92 | 448.75 |

Row 4 results show the performance of a PMR writer formed according to an embodiment (FIG. 7A) of the present disclosure where FG devices are formed in all of the gaps around the MP, and each of the SS and LS are replaced with a non-magnetic conductor layer. Note the change in the write field (row 4 vs. row 3) is <1%, and the TS return field is more favorably negative, which means a larger write field gradient in the down-track direction. Under a fixed Hy, a more negative TS return field typically yields a gain in BER. Meanwhile, the change in EWAC is quite small at 5000 Oe, and presumably even smaller and in an acceptable regime if a higher coercivity medium and a 9000 Oe write field (or even a write field at 1.2-1.3 Tesla) are employed. The SS stray field is at an acceptable level.

The present disclosure also encompasses a method of fabricating a PMR writer structure wherein a FG device is formed in each of the gaps surrounding the MP tip, and each of the SS and LS are replaced with a NMC layer as described in the first embodiment, for example. From a perspective at the eventual ABS in FIG. 17, NMC1 layer 91 formed on a sub-structure (not shown) is provided as a starting point. NMC2 layer 92 is deposited by a sputter deposition method and an opening 55 is formed therein using a conventional photoresist patterning and etching sequence to expose a portion of NMC1 layer top surface 91t. Inner sides 92s on the NMC2 layer are equidistant from center plane 44-44 that bisects the opening.

Figure 17:
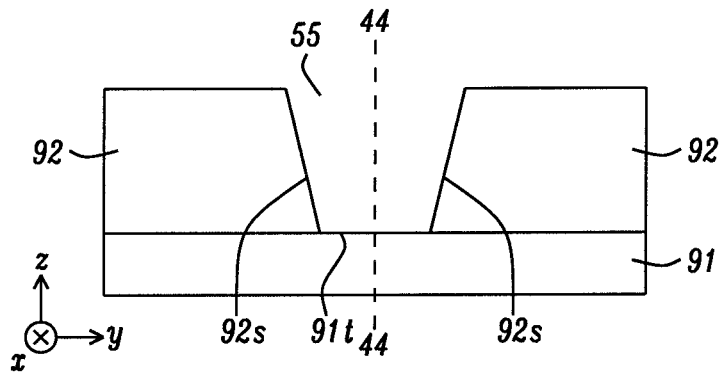
FIG. 17, and FIGS. 19-22 are ABS views showing a sequence of steps used to fabricate a FGL in each gap around the MP, and non-magnetic conductors adjoining each of the LG and SG according to an embodiment of the present disclosure.
Figure 18:
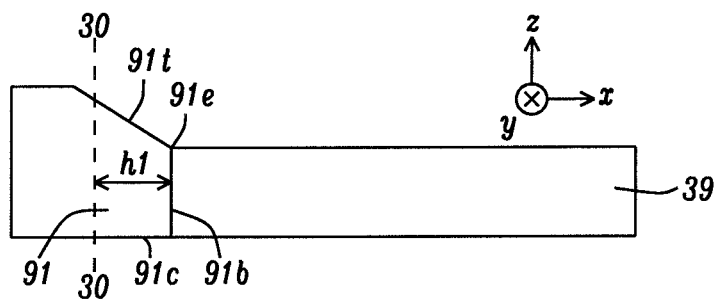
FIG. 18 is a down-track cross-sectional view of a partially formed PMR writer wherein a taper is formed on a non-magnetic conductor that is used to replace a leading shield according to an embodiment of the present disclosure.

FIG. 18 is a down-track cross-sectional view along plane 44-44 in FIG. 17 and shows the eventual ABS (plane 30-30) that is determined after a lapping process at the end of the PMR writer fabrication sequence. A well known photoresist patterning and etching sequence is used to form a NMC1 tapered top surface 91t that intersects the eventual ABS and terminates at a back end 91e at NMC1 layer backside 91b which adjoins insulation layer 39 at a first height h1 from plane 30-30. The top surface 91t at plane 30-30 is a greater down-track distance than the back end from the NMC1 layer bottom surface 91c.

Figure 19:
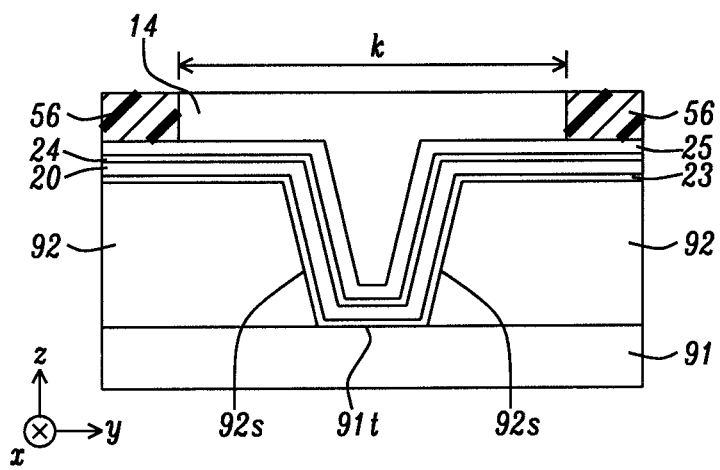

Thereafter, in FIG. 19, NML2 23, FGL 20, NML1 24, and SP layer 25 are sequentially deposited on NMC2 layer sides 92s and on NMC1 top surface 91t. A physical vapor deposition (PVD) method may be employed to provide conformal layers. Next, a photoresist layer 56 is coated and patterned to form an opening (not shown) having a cross-track width k that exposes the SP layer 25 within partially filled opening 55. Then the MP 14 is plated using a conventional method to fill the photoresist opening and also opening 55.

Figure 20:
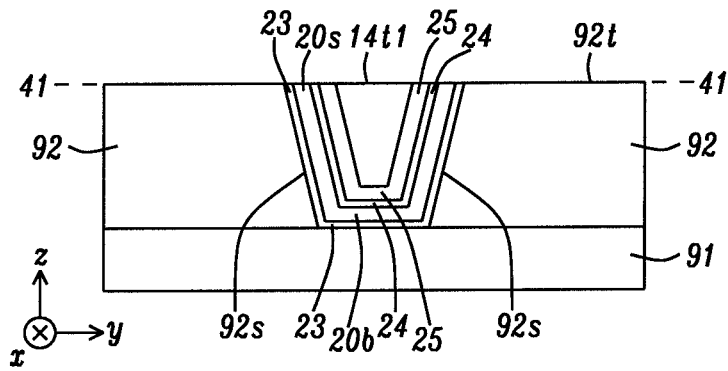

In FIG. 20, a chemical mechanical polish (CMP) process is employed to remove the photoresist layer, top portions of the MP including MP tip 14p, and the portions of SP layer 25, NML1 24, FGL 20, and NML2 23 above NMC2 top surface 92t. As a result, NMC2 top surface 92t is coplanar with MP trailing side 14t1 at plane 41-41. A conventional ion beam etch (IBE) process involving a photoresist masking layer may be used at this point to form a tapered top surface on the MP tip, NMC2 layer, and adjacent FG device layers. Note that FG device 22-2 comprised of SP layer 25, NML1 24, FGL 20s, and NML2 23 is formed on each NMC2 side 92s, and FG device 22-3 comprised of SP layer 25, NML1 24, FGL 20b, and NML2 23 is formed on NMC1 top surface 91t.

Figure 21:
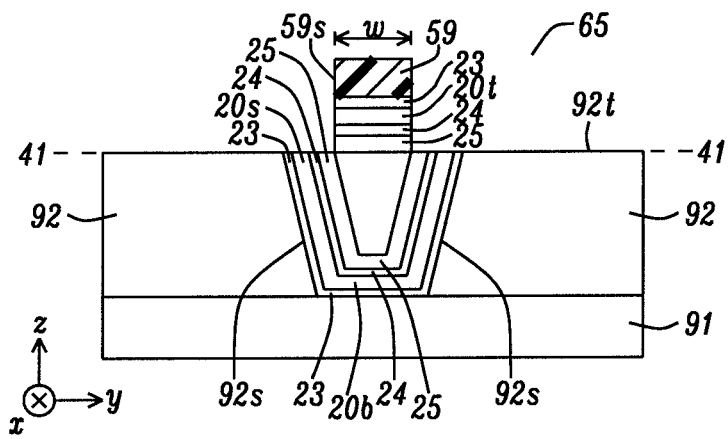

Thereafter, as shown in FIG. 21, the process flow continues by depositing a FG device stack of layers wherein SP layer 25, NML1 24, FGL 20t, and NML2 23 are sequentially formed on NMC2 92 and the MP trailing side 14t1. A photoresist layer 59 is coated on the FG device stack and is patterned to yield a width w between sides 59s, and openings 65 on each side of the photoresist layer. A reactive ion etch (RIE) or ion beam etch (IBE) is performed to remove exposed portions of the FG device stack of layers and stop on NMC2 top surface 92t thereby yielding FG device 22-1.

Figure 22:
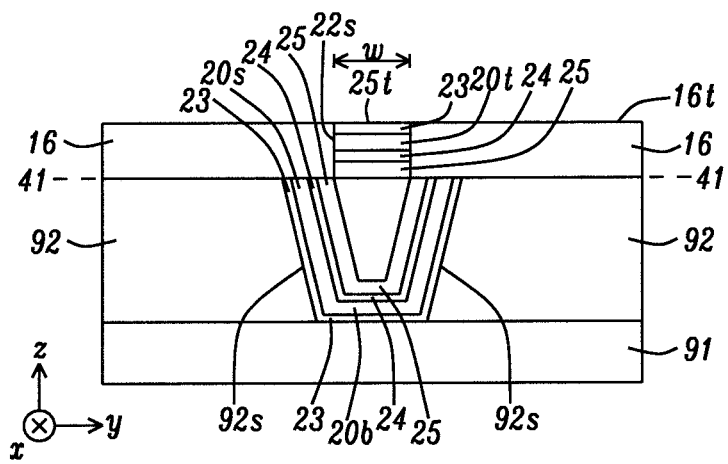

Referring to FIG. 22, WG 16 is deposited on exposed portions of NMC2 top surface 92t, and a CMP process is performed to remove any remaining photoresist layer 59, and form a WG top surface 16t that is coplanar with a top surface 23t of NML2 23 in FG device 22-1. The WG adjoins each side 22s of FG device 22-1.

Next, a conventional sequence of steps is followed to deposit the first TS layer 17, form sides 16s, 17s on the WG and first TS layer, respectively, and then deposit the second TS layer 18 described previously with respect to FIG. 7C. In a subsequent series of steps, an upper portion of the PMR writer structure is fabricated to provide a combined read-write head 1 such as the structure shown in FIG. 4, and a lapping process is performed to generate an ABS 30-30.

In addition to the advantages mentioned earlier with regard to greater flexibility in selecting materials to optimize WG protrusion and improve resistance to corrosion when NMC1 and NMC2 replace the LS and SS, respectively, there is also better process flexibility in view of the relaxed control of the boundaries between NMC1 and NMC2 and the surrounding insulation layers. It should also be understood that a higher coercivity magnetic medium, which reduces EWAC when a higher write field (i.e. 9000 Oe) is used for a PMR writer of the present disclosure (row 4 in Table 1), also enables better thermal robustness for the magnetic medium, and avoids unnecessary writing from stray fields.

While the present disclosure has been particularly shown and described with reference to, the preferred embodiments thereof, it will be understood by those skilled in the art that various changes in form and details may be made without departing from the spirit and scope of this disclosure.

We claim:

1. A perpendicular magnetic recording (PMR) writer, comprising:
   (a) a main pole (MP) having a pole tip with a leading side and a trailing side, the leading side adjoins a lead gap (LG) at an air bearing surface (ABS), and the trailing side has a track width and adjoins a write gap (WG) at the ABS, and the MP trailing side at the ABS is at a first plane that is orthogonal to the ABS;
   (b) a side gap (SG) which contacts a side of the MP tip formed between the trailing side and leading side on each side of a center plane that bisects the MP tip in a direction orthogonal to the ABS and the first plane;
   (c) a shield structure comprising a first trailing shield (TS) on the WG, and a second TS on the first TS and contacting the first plane on portions thereof proximate to a WG side on each side of the center plane; and
   (d) a flux guiding (FG) device that is formed in each of the WG, SG, and LG and known as $FG_{WG}$, $FG_{SG}$, and $FG_{LG}$, respectively, and wherein each of the FG devices comprises a flux guiding layer (FGL) and is configured so that a FGL magnetization in $FG_{WG}$, $FG_{SG}$, and $FG_{LG}$ flips to a direction substantially opposing a flux field in the WG, SG, and LG, respectively, when a current ($I_b$) of sufficient current density is applied across the WG, SG, and LG so that reluctance is increased in each of the WG, SG, and LG thereby enhancing a write field from the MP tip on a magnetic medium; and
   (e) at least one of a first non-magnetic conductor (NMC1) with an inner side that adjoins a side of the $FG_{LG}$ that faces away from the MP leading side, and a second non-magnetic conductor (NMC2) with an inner side that adjoins a side of each $FG_{SG}$ that faces away from a MP tip side, and wherein NMC1 is configured to enable the current $I_b$ to flow across the LG, and wherein NMC2 is configured to enable the current $I_b$ to flow across each SG.

2. The PMR writer of claim 1 wherein NMC1 and each NMC2 are comprised of one or more of Ru, Cr, Pd, Pt, Ti, W, and Ta.

3. The PMR writer of claim 1 wherein each NMC2 contacts the second TS at the first plane, and wherein NMC1 adjoins a bottom surface of each NMC2 or a bottom surface of a side shield at a second plane that is parallel to the first plane.

4. The PMR writer of claim 1 wherein the PMR writer comprises NMC1 but not NMC2, and a side shield contacts the side of the $FG_{SG}$ that faces away from the MP tip side on each side of the center plane.

5. The PMR writer of claim 1 wherein the PMR writer comprises NMC2 but not NMC1, and a leading shield contacts the side of the $FG_{LG}$ that faces away from the MP leading side.

6. The PMR writer of claim 1 wherein each of $FG_{WG}$, $FG_{SG}$, and $FG_{LG}$ is further comprised of an outer spin polarization (SP) layer, a first non-magnetic layer (NML1) between the FGL and SP layer, and an inner second non-magnetic layer (NML2) that contacts the MP tip, and wherein the current $I_b$ flows across each FG device from the SP layer to the MP tip, and the SP layer spin polarizes the current $I_b$ to generate a spin torque on the FGL layer that results in the FGL magnetization flipping.

7. The PMR writer of claim 1 wherein each of $FG_{WG}$, $FG_{SG}$, and $FG_{LG}$ is further comprised of an inner spin polarization (SP) layer that contacts the MP tip, a first non-magnetic layer (NML1) between the FGL and SP layer, and an outer second non-magnetic layer (NML2), and wherein the current $I_b$ flows across each FG device from the MP tip and through the SP layer to the NML2, and the SP layer spin polarizes the current $I_b$ to generate a spin torque on the FGL layer that results in the FGL magnetization flipping.

8. The PMR writer of claim 6 wherein the NML1 is a spin preserving layer that is one of Cu, Ag, Au, Cr, and Al.

9. The PMR writer of claim 6 wherein the NML2 is a non-spin preserving layer that is one of Ta, Ru, W, Pt, and Ti.

10. The PMR writer of claim 6 wherein each the FGL and SP layers is a single layer or multilayer comprised of one or more of $Ni_xFe_{100-x}$, $Co_yFe_{100-y}$, $Co_zNi_{100-z}$, or alloys thereof with B where each of x, y, and z is from 0 to 100 atomic %, or is a laminate that is $(Co/Ni)_n$, $(CoFe/Ni)_n$, $(Fe/Pt)_n$, and $(Fe/Pd)_n$ where n is a lamination number.

11. The PMR writer of claim 1 wherein the current $I_b$ has a current density that is in a range of $1\times10^{-7}$ to $1\times10^{-9}$ Amp/cm$^2$.

12. A head gimbal assembly (HGA), comprising:
   (a) the PMR writer of claim 1; and
   (b) a suspension that elastically supports the PMR writer, wherein the suspension has a flexure to which the PMR writer is joined, a load beam with one end connected to the flexure, and a base plate connected to the other end of the load beam.

13. A magnetic recording apparatus, comprising:
   (a) the HGA of claim 12;
   (b) a magnetic recording medium positioned opposite to a slider on which the PMR writer is formed;
   (c) a spindle motor that rotates and drives the magnetic recording medium; and
   (d) a device that supports the slider, and that positions the slider relative to the magnetic recording medium.

* * * * *